US012802339B2

(12) United States Patent
Zhang et al.

(10) Patent No.: US 12,802,339 B2
(45) Date of Patent: Nov. 17, 2026

(54) RASTERIZING DEPTH IN GAUSSIAN SPLATTING

(71) Applicant: The Hong Kong University of Science and Technology, Kowloon (HK)

(72) Inventors: Baowen Zhang, New Territories (HK); Chuan Fang, New Territories (HK); Xiaoxiao Long, New Territories (HK); Ping Tan, New Territories (HK)

(73) Assignee: The Hong Kong University of Science and Technology, Kowloon (HK)

( * ) Notice: Subject to any disclaimer, the term of this patent is extended or adjusted under 35 U.S.C. 154(b) by 0 days.

(21) Appl. No.: 19/256,704

(22) Filed: Jul. 1, 2025

(65) Prior Publication Data

US 2026/0024269 A1 Jan. 22, 2026

Related U.S. Application Data

(60) Provisional application No. 63/673,181, filed on Jul. 19, 2024.

(51) Int. Cl.
*G06T 15/08* (2011.01)
*G05D 1/622* (2024.01)
(Continued)

(52) U.S. Cl.
CPC ............ *G06T 15/08* (2013.01); *G05D 1/622* (2024.01); *G06T 3/02* (2024.01); *G06T 15/06* (2013.01);
(Continued)

(58) Field of Classification Search
CPC ........... G06T 15/08; G06T 3/02; G06T 15/06; G06T 15/10; G06T 17/00; G06T 19/006;
(Continued)

(56) References Cited

U.S. PATENT DOCUMENTS 5,299,298 A * 3/1994 Elmquist ................ G06T 15/60 345/426
8,379,021 B1 * 2/2013 Miller ..................... G06T 15/60 345/426
(Continued)

FOREIGN PATENT DOCUMENTS

CN 118314280 A 7/2024

OTHER PUBLICATIONS

Barnes et al., "PatchMatch: A Randomized Correspondence Algorithm for Structural Image Editing", ACM Transactions on Graphics, vol. 28, No. 3, Article 24, Aug. 2009, 12 pages.
(Continued)

*Primary Examiner* — Richard M Camby
(74) *Attorney, Agent, or Firm* — Amin, Turocy & Watson, LLP

(57) ABSTRACT

The subject technologies relate to rasterizing depth in Gaussian Splatting. An example method facilitates rasterizing depth in Gaussian Splatting and includes rasterizing a depth map associated with a group of Gaussian splats representative of a three-dimensional object, the rasterizing of the depth map including determining spatially varying depths within a Gaussian splat of the group of Gaussian splats. The method further includes rasterizing a surface normal map associated with the group of Gaussian splats, and reconstructing a three-dimensional model of the three-dimensional object based on the depth map and the surface normal map associated with the group of Gaussian splats.

20 Claims, 14 Drawing Sheets

(51) Int. Cl.

| | |
|---|---|
| ***G06T 3/02*** | (2024.01) |
| ***G06T 15/06*** | (2011.01) |
| ***G06T 15/10*** | (2011.01) |
| ***G06T 17/00*** | (2006.01) |
| ***G06T 19/00*** | (2011.01) |
| *G05D 101/10* | (2024.01) |

(52) U.S. Cl.
CPC ............. *G06T 15/10* (2013.01); *G06T 17/00* (2013.01); *G06T 19/006* (2013.01); *G05D 2101/10* (2024.01); *G06T 2210/21* (2013.01)

(58) Field of Classification Search
CPC ... G06T 2210/21; G06T 15/20; G06T 15/205; G06T 15/40; G06T 17/20; G06T 19/20; G05D 1/622; G05D 2101/10
See application file for complete search history.

(56) References Cited

U.S. PATENT DOCUMENTS

| | | | | |
|---|---|---|---|---|
| 2007/0103479 | A1* | 5/2007 | Kim | G06T 15/205 345/581 |
| 2020/0380765 | A1 | 12/2020 | Thudor et al. | |
| 2021/0295598 | A1 | 9/2021 | Hughes | |

OTHER PUBLICATIONS

Barron et al., "Mip-NeRF: A Multiscale Representation for Anti-Aliasing Neural Radiance Fields", In Proceedings of the IEEE/CVF International Conference on Computer Vision, 2021, pp. 5855-5864.
Barron et al., "Mip-NeRF 360: Unbounded Anti-Aliased Neural Radiance Fields", In Proceedings of the IEEE/CVF Conference on Computer Vision and Pattern Recognition, 2022, pp. 5470-5479.
Bleyer et al., "PatchMatch Stereo-Stereo Matching with Slanted Support Windows", In BMVC, 2011, 11 pages.
Chen et al., "NeuSG: Neural Implicit Surface Reconstruction with 3D Gaussian Splatting Guidance", arXiv:2312.00846v2, Mar. 17, 2025, 14 pages.
Chen et al., "MobileNeRF: Exploiting the Polygon Rasterization Pipeline for Efficient Neural Field Rendering on Mobile Architectures", In Proceedings of the IEEE/CVF Conference on Computer Vision and Pattern Recognition, 2023, pp. 16569-16578.
Collins, Robert, "A Space-sweep Approach to True Multi-Image Matching", In Conference on Computer Vision and Pattern Recognition, 1996, 8 pages.
Curless et al., "A Volumetric Method for Building Complex Models from Range Images", In SIGGRAPH, 1996, 10 pages.
Curless et al., "A Volumetric Method for Building Complex Models from Range Images", ACM. 1996, pp. 303-312.
Ding et al., "TransMVSNet: Global Context-aware Multi-view Stereo Network with Transformers", In Conference on Computer Vision and Pattern Recognition, 2022, pp. 8585-8594.
Fan et al., "LightGaussian: Unbounded 3D Gaussian Compression with 15x Reduction and 200+ FPS", 38th Conference on Neural Information Processing Systems(NeurIPS 2024), 2024, 21 pages.
Fridovich-Keil et al., "Plenoxels: Radiance Fields Without Neural Networks", In Proceedings of the IEEE/CVF Conference on Computer Vision and Pattern Recognition, 2022, pp. 5501-5510.
Fuhrmann et al., "Mve—a Multi-view Reconstruction Environment", Eurographics Workshop on Graphics and Cultural Heritage, 2014, 8 pages.
Gu et al., "Cascade Cost Volume for High-Resolution Multi-View Stereo and Stereo Matching", arXiv:1912.06378v3, Jun. 5, 2020, 15 pages.
Gu et al., "Cascade Cost Volume for High-resolution Multi-view Stereo and Stereo Matching", In Conference on Computer Vision and Pattern Recognition(CVPR), 2020, pp. 2495-2504.
Guedon et al., "SuGaR: Surface-Aligned Gaussian Splatting for Efficient 3D Mesh Reconstruction and High-Quality Mesh Rendering", arXiv:2311.12775v3, Dec. 2, 2023, 14 pages.
Hedman et al., "Baking Neural Radiance Fields for Real-time View Synthesis", In Proceedings of the IEEE/CVF International Conference on Computer Vision, 2021, pp. 5875-5884.
Huang et al., "2D Gaussian Splatting for Geometrically Accurate Radiance Fields", SIGGRAPH Conference Papers '24, Jul. 27-Aug. 1, 2024, 11 pages.
Jensen et al., "Large Scale Multi-view Stereopsis Evaluation", In Proceedings of the IEEE Conference on Computer Vision and Pattern Recognition, 8 pages.
Jiang et al., "GaussianShader: 3D Gaussian Splatting with Shading Functions for Reflective Surfaces", arXiv:2311.17977v1, Nov. 29, 2023, 13 pages.
Kendall et al., "End-to-End Learning of Geometry and Context for Deep Stereo Regression", In Conference on Computer Vision and Pattern Recognition (CVPR), 2017, pp. 66-75.
Kerbl et al., "3d Gaussian Splatting for Real-time Radiance Field Rendering", ACM Transactions on Graphics, vol. 42, No. 4, Article 1, Aug. 8, 2023, 14 pages.
Knapitsch et al., "Tanks and Temples: Benchmarking Large-Scale Scene Reconstruction", SIGGRAPH, 2017, 13 pages.
Kolmogorov et al., "Computing Visual Correspondence with Occlusions Using Graph Cuts", Proceedings 18th IEEE International Conference on Computer Vision, 2001, pp. 508-515.
Kolmogorov et al., "What Energy Functions Can be Minimized Via Graph Cuts?", IEEE Transactions on Pattern Analysis and Machine Intelligence, vol. 26, No. 2, Feb. 2004, pp. 147-159.
Li et al., "Neuralangelo: High-Fidelity Neural Surface Reconstruction", arXiv:2306.03092v2, Jun. 12, 2023, 18 pages.
Lin et al., "VastGaussian: Vast 3D Gaussians for Large Scene Reconstruction", arXiv:2402.17427v1, Feb. 27, 2024, 12 pages.
Žbontar et al., "Computing the Stereo Matching Cost with a Convolutional Neural Network", In Conference on Computer Vision and Pattern Recognition (CVPR), arXiv:1409.4326v2 [cs.CV] Oct. 20, 2015.
Mildenhall et al., "NeRF: Representing Scenes as Neural Radiance Fields for View Synthesis", Communications of the ACM, vol. 65, No. 1, Jan. 2022, pp. 99-106.
Muller et al., "Instant Neural Graphics Primitives with a Multiresolution Hash Encoding", ACM Transactions on Graphics, vol. 41, No. 4, Article 102, Jul. 2022, 15 pages.
Newcombe et al., "KinectFusion: Real-Time Dense Surface Mapping and Tracking", In 2011 10th IEEE International Symposium On Mixed and Augmented Reality, 2011, 10 pages.
Reiser et al., "MERF: Memory-efficient Radiance Fields for Real-time View Synthesis in Unbounded Scenes", ACM Transactions on Graphics, vol. 42, No. 4, Jul. 26, 2023, pp. 1-12.
Schnoberger et al., "Structure-from-Motion Revisited", In Conference on Computer Vision and Pattern Recognition (CVPR), 2016, pp. 4104-4113.
Sun et al., "Stereo Matching Using Belief Propagation", IEEE Transactions on Pattern Analysis and Machine Intelligence, vol. 25, No. 7, Jul. 2003, 14 pages.
Vespa et al., "Adaptive-resolution Octree-based Volumetric SLAM", In 2019 International Conference on 3D Vision (3DV), IEEE, 2019, 9 pages.
Wang et al., "NeuRIS: Neural Reconstruction of Indoor Scenes Using Normal Priors", In European Conference on Computer Vision, 2022, pp. 139-155.
Wang et al., "NeuS: Learning Neural Implicit Surfaces by Volume Rendering for Multi-view Reconstruction", 35th Conference on Neural Information Processing Systems, arXiv:2106.10689v3, 2021, 23 pages.
Yao et al., "MVSNet: Depth Inference for Unstructured Multi-view Stereo", In Proceedings of the European In Proceedings of the European Conference on Computer Vision(ECCV), 2018, 17 pages.
Yariv et al., "Volume Rendering of Neural Implicit Surfaces", 35th Conference on Neural Information Processing Systems, 2021, 11 pages.
Ye et al., "AbsGS: Recovering Fine Details for 3D Gaussian Splatting", arXiv:2404.10484v1, Apr. 16, 2024, 16 pages.

(56) References Cited

OTHER PUBLICATIONS

Yu et al., "PlenOctrees for Real-time Rendering of Neural Radiance Fields", In Proceedings of the IEEE/CVF International Conference on Computer Vision, 2021, pp. 5752-5761.
Yu et al., "GSDF: 3DGS Meets SDF for Improved Rendering and Reconstruction", arXiv preprintarXiv:2403.16964v2, Oct. 13, 2024, 24 pages.
Yu et al., "Mip-Splatting: Alias-free 3D Gaussian Splatting", Conference on Computer Vision and Pattern Recognition, 2024, pp. 19447-19456.
Yu et al., "MonoSDF: Exploring Monocular Geometric Cues For Neural Implicit Surface Reconstruction", 36th Conference on Neural Information Processing Systems, 2022, 15 pages.
Yu et al., "Gaussian Opacity Fields: Efficient and Compact Surface Reconstruction in Unbounded Scenes", arXiv:2404.10772v2, ACM Transactions on Graphics, vol. 43, No. 6, Dec. 2024, 15 pages.
Zach et al., "A Globally Optimal Algorithm for Robust TV-L1 Range Image Integration", In International Conference on Computer Vision (ICCV), 2011, 8 pages.
Luo et al., "Efficient Deep Learning for Stereo Matching", In Conference on Computer Vision and Pattern Recognition (CVPR), 2015.
Zwicker et al., "EWA Splatting", IEEE Transactions on Visualization and Computer Graphics, vol. 8, No. 3, Jul. 1, 2002, pp. 223-238.
Lorensen et al., "Marching Cubes: A High Resolution 3D Surface Construction Algorithm", In Seminal Graphics: Pioneering Efforts that Shaped the Field, 1998, pp. 347-353.
Wang et al., "DC-Gaussian: Improving 3D Gaussian Splatting for Reflective Dash Cam Videos", arXiv:2405.17705v3, Nov. 5, 2024, 23 pages.
Dalal, et al., "Gaussian Splatting: 3D Reconstruction and Novel View Synthesis: A Review," Received May 6, 2024, accepted May 26, 2024, date of publication Jun. 3, 2024, date of current version Jul. 23, 2024, Digital Object Identifier 10.1109/ACCESS.2024.3408318.
Cheng, et al., "GaussianPro: 3D Gaussian Splatting with Progressive Propagation," arXiv:2402.14650v1 [cs.CV] Feb. 22, 2024.
Fang, et al., "Mini-Splatting: Representing Scenes with a Constrained No. of Gaussians," arXiv:2403.14166v2 [cs.CV] May 18, 2024.

* cited by examiner

502

504

902

904

912

914

920

RASTERIZING DEPTH IN GAUSSIAN SPLATTING

CROSS-REFERENCE TO RELATED APPLICATION

The present application claims the benefit of priority to U.S. Provisional Patent Application No. 63/673,181, filed Jul. 19, 2024, and entitled "RaDe-GS: Rasterizing Depth in Gaussian Splatting," the entirety of which priority application is incorporated herein by reference.

BACKGROUND

Three-dimensional (3D) reconstruction from multi-view images is a classic problem with numerous applications in computer vision and graphics. This task typically involves generating depth maps through multi-view stereo algorithms that utilize sophisticated optimization methods or pretrained neural networks. The depth maps estimated from different viewpoints can then be integrated to create a complete triangle mesh model.

SUMMARY

The following summary is a general overview of various embodiments disclosed herein and is not intended to be exhaustive or limiting upon the disclosed embodiments. Embodiments are better understood upon consideration of the detailed description below in conjunction with the accompanying drawings and claims.

In an example implementation, a system is described herein. The system can include at least one processor and at least one memory that stores executable instructions that, when executed by the at least one processor, facilitate performance of operations. The operations can include rasterizing a depth map associated with a group of Gaussian primitives representative of a three-dimensional object. The rasterizing of the depth map can include determining spatially varying depths within a Gaussian primitive of the group of Gaussian primitives. The operations can also include rasterizing a surface normal map associated with the group of Gaussian primitives. The operations can further include rendering, based on the depth map and the surface normal map associated with the group of Gaussian primitives, a three-dimensional reconstruction of the three-dimensional object.

In another example implementation, a method is described herein. The method can include rasterizing, by a system including at least one processor, a depth map associated with a group of Gaussian splats representative of a three-dimensional object, the rasterizing of the depth map including determining spatially varying depths within a Gaussian splat of the group of Gaussian splats. The method can further include rasterizing, by the system, a surface normal map associated with the group of Gaussian splats. The method can additionally include reconstructing, by the system, a three-dimensional model of the three-dimensional object based on the depth map and the surface normal map associated with the group of Gaussian splats.

In an additional example implementation, a non-transitory machine-readable medium is described herein that can include instructions that, when executed by at least one processor, facilitate performance of operations. The operations can include rasterizing a depth map associated with a group of Gaussian splats representative of a three-dimensional scene, the rasterizing of the depth map including determining spatially varying depths within a Gaussian splat of the group of Gaussian splats; rasterizing a surface normal map associated with the group of Gaussian splats; and constructing a model of the three-dimensional scene based on the depth map and the surface normal map associated with the group of Gaussian splats.

DESCRIPTION OF DRAWINGS

Various non-limiting embodiments of the subject disclosure are described with reference to the following figures, wherein like reference numerals refer to like parts throughout unless otherwise specified.

DETAILED DESCRIPTION

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring subject matter.

Various implementations described herein relate to techniques for rasterizing depth and/or surface normal directions in connection with Gaussian Splatting (GS) implementations. GS has proven to be highly effective in novel view synthesis, achieving high-quality and real-time rendering. However, its potential for reconstructing detailed three-dimensional (3D) shapes has not been fully explored. For instance, existing methods often suffer from limited shape accuracy due to the discrete and unstructured nature of Gaussian splats, which complicates the shape extraction. While some existing techniques have attempted to improve shape reconstruction, they often reformulate Gaussian primitives in ways that reduce both rendering quality and computational efficiency. To address these problems, various implementations described herein provide a rasterized approach to render depth maps and surface normal maps of general 3D Gaussian splats. Implementations as described herein not only significantly enhance shape reconstruction accuracy but also maintain the computational efficiency intrinsic to GS. Techniques as described herein can achieve reconstruction accuracy that is similar to more computationally expensive techniques while maintaining similar training and rendering time to traditional GS techniques. Implementations described herein can provide significant advancement in GS and can be directly integrated into existing GS-based methods.

Figure 1:
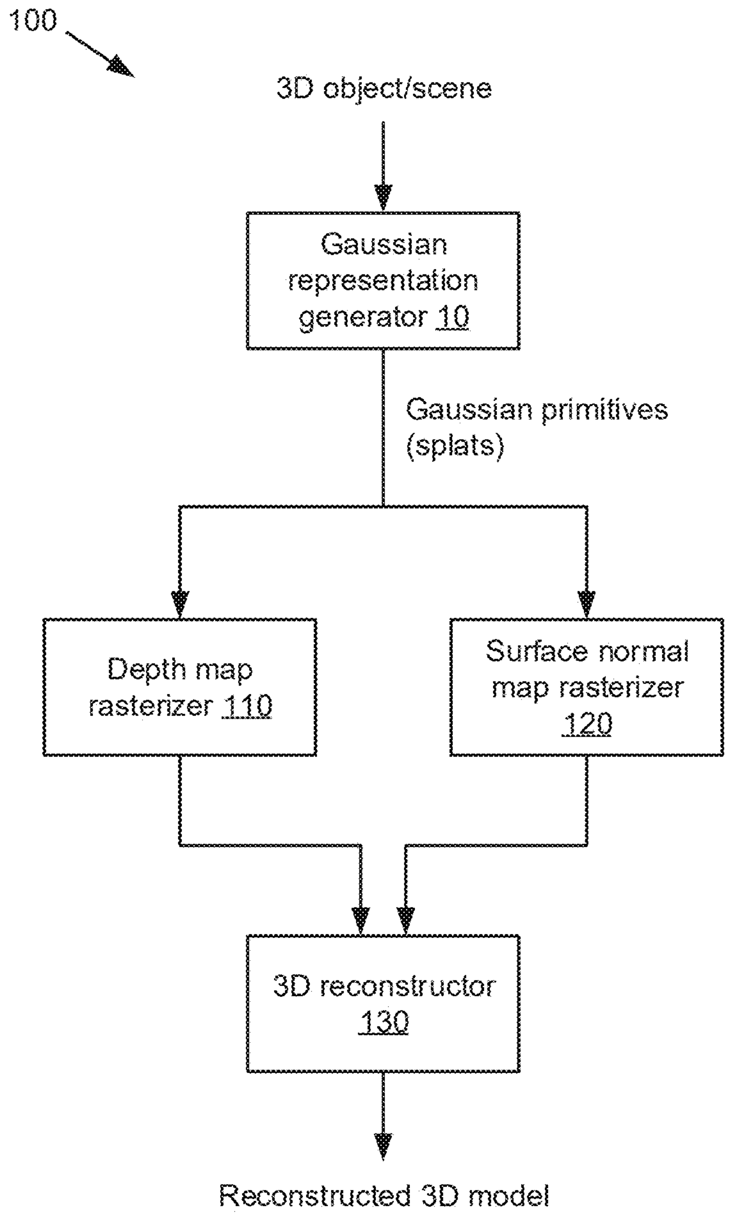
FIGS. 1-2 are block diagrams of respective systems that facilitate rasterizing depth in Gaussian Splatting in accordance with various implementations described herein.

With reference now to the drawings, FIG. 1 illustrates a block diagram of a system 100 that facilitates rasterizing depth in Gaussian Splatting in accordance with various implementations described herein. System 100 as shown in FIG. 1 includes executable components, e.g., a depth map rasterizer 110, a surface normal map rasterizer 120, and a 3D reconstructor 130, each of which can operate as described in further detail below. Additionally, FIG. 1 also includes a Gaussian representation generator 10, which can be an additional executable component that can be part of, or separate from, system 100 in some implementations.

In an example implementation, the components 110, 120, 130 of system 100 can be implemented in hardware, software, or a combination of hardware and software. By way of example, the components 110, 120, 130 can be stored on at least one memory and executed by at least one processor. An example of a computer architecture including a processor and memory that can be used to implement the components 110, 120, 130, as well as other components as will be described herein, is shown and described in further detail below with respect to FIG. 13. In some implementations, the executable components 110, 120, 130 of system 100, the Gaussian representation generator 10 shown in FIG. 1, and/or other system elements, can communicate with each other via a bus and/or other components that provide intercommunication between various elements of system 100.

Additionally, it is noted that the functionality of the respective components shown and described herein can be implemented via a single computing device and/or a combination of devices. For instance, in various implementations, the depth map rasterizer 110 shown in FIG. 1 could be implemented via a first device, the surface normal map rasterizer 120 could be implemented via the first device or a second device, and the 3D reconstructor 130 could be implemented via the first device, the second device, or a third device. Also, or alternatively, the functionality of a single component could be divided among multiple devices in some implementations.

With reference now to the components of system 100, the depth map rasterizer 110 can rasterize a depth map associated with a group of Gaussian primitives (splats), e.g., Gaussian splats generated by the Gaussian representation generator 10, that are representative of a 3D object or scene. As will be described in further detail below, rasterization of a depth map by the depth map rasterizer 110 can include determining spatially varying depths within respective Gaussian primitives of a given group of Gaussian primitives. Similarly, the surface normal map rasterizer 120 can rasterize a surface normal map associated with the group of Gaussian primitives, e.g., as will be described in further detail below.

The 3D reconstructor 130 of system 100 can render, based on a depth map generated by the depth map rasterizer 110 and a surface normal map generated by the surface normal map rasterizer 120, a 3D reconstruction of the 3D object or scene associated with the group of Gaussian primitives. As will be described in further detail below, the generated 3D reconstruction can then be utilized in real-world applications such as gaming, virtual reality (VR) and/or augmented reality (AR), simulation, autonomous vehicle navigation and collision avoidance, and/or other suitable applications. Respective examples of applications that can utilize reconstructed objects and/or scenes in this manner are described in further detail below with respect to FIGS. 7-8.

As noted above, 3D reconstruction from multi-view images typically involves generating depth maps through multi-view stereo algorithms that utilize sophisticated optimization methods or pretrained neural networks. Although this traditional image-based modeling approach delivers accurate results, it has limited robustness, particularly on reflective and shiny surfaces.

Neural Radiance Field (NeRF) employs an implicit representation of 3D scenes and achieves photorealistic results for novel-view rendering through an analysis-by-synthesis approach. Despite its success, the original NeRF method tends to produce biased depth maps and noisy 3D reconstruction. NeuS incorporates a Signed Distance Function (SDF) into the NeRF framework, significantly improving the accuracy of depth and shape reconstructions. These improvements in 3D reconstruction accuracy are further enhanced by hierarchical volumetric features in NeuraLangelo. However, the implicit representation of 3D scenes requires ray tracing to render images, which makes the training of NeRF computationally inefficient. Consequently, these methods often take several hours to optimize a 3D model from a set of input images.

Gaussian Splatting (GS) introduces an explicit representation for more efficient optimization and rendering. It represents a 3D scene using a set of translucent Gaussian spheres, which can be rendered efficiently by rasterization and can reconstruct a 3D scene in minutes. However, this representation complicates the computation of SDFs. Consequently, it is hard to extract 3D surfaces from Gaussians, which are necessary for applications like simulation and obstacle detection. Some approaches attempt to make the Gaussian spheres planar to facilitate surface extraction. However, this lower dimensional representation leads to optimization challenges, especially for complicated shapes. In general, 2D GS methods decrease the Peak Signal-to-Noise Ratio (PSNR) and extend optimization time. To address these challenges, some approaches introduce a ray-tracing based method to compute the opacity along light rays to extract high-quality surfaces. While a ray tracing approach generates excellent surface reconstruction, the ray-tracing process costs significant computational overhead. For example, a ray tracing technique requires about one hour to optimize a scene from the Tanks & Temples (TNT) dataset, while the standard GS method takes only about 15 minutes.

In view of at least the above, various implementations described herein can be used to compute depth maps for general Gaussian splats. The implementations described herein can have similar computation efficiency as standard GS due to the rasterized approach in computing depth and normal maps. On the TNT dataset, average computation time for implementations as described herein is 17 minutes. Moreover, implementations as described herein can generate high-quality 3D reconstructions. For instance, implementations as described herein can achieve a shape reconstruction accuracy of 0.69 mm on the DTU dataset. This performance matches that of the implicit method NeuraLangelo, which has an accuracy of 0.61 mm, and exceeds that of other existing GS-based methods.

In addition, a closed-form solution for the intersections of light rays and Gaussian splats is provided herein. Specifically, Gaussian values can be evaluated along each light ray from the camera center. The intersecting point on each ray can be identified as the point where the Gaussian values are maximized. These intersection points between a Gaussian splat and a bundle of light rays lie on a general curved surface, which defines the projected depth of a Gaussian splat on the image plane. It is noted that these intersection points are co-planar under the approximate affine projection. As a result, the projected depth of each Gaussian splat can be computed efficiently by rasterization according to a derived planar equation as given herein. The final depth map can then be computed as the median depth among the projected Gaussian splats, taking into account their translucency. Similarly, the surface normal map can be derived through rasterized computation. This approach allows the production of accurate depth and normal maps while maintaining the rendering and optimization efficiency of GS.

In summary, implementations described herein provide a novel rasterized method for computing depth and normal maps tailored to general Gaussian splats. Experimental evaluation demonstrates that the techniques described herein achieve high-quality 3D reconstructions, comparable to those of NeuraLangelo, while maintaining rendering and optimization efficiency on par with the original 3D GS.

Gaussian Splatting employs a set of 3D Gaussian primitives to represent a 3D scene. Combined with rasterized rendering, it achieves real-time rendering and fast optimization. However, extracting 3D surfaces from Gaussian splats remains challenging due to their discrete and unstructured nature. To overcome this challenge, some existing approaches favor flat Gaussians that better align with object surfaces. Other existing approaches propose a dual-branch network combining the standard 3D GS with NeuS to improve rendering fidelity and reconstruction accuracy simultaneously. Moreover, post-processing and joint-optimization methods can improve the results, but at the cost of increased training time. 2D GS directly replaces 3D Gaussian primitives with flat 2D Gaussians for effective surface reconstruction. Yet, it sacrifices novel-view synthesis capability and training stability because the 2D Gaussians can lead to degenerate scene representation and fail to capture more complicated scenes.

In contrast, techniques described herein can analyze the depth evaluation in standard 3D Gaussian splats and provide a novel rasterized method for depth map computation. As a result, precise surface reconstruction can be achieved while also retaining the rendering and optimization efficiency of 3D Gaussian splats.

Figure 2:
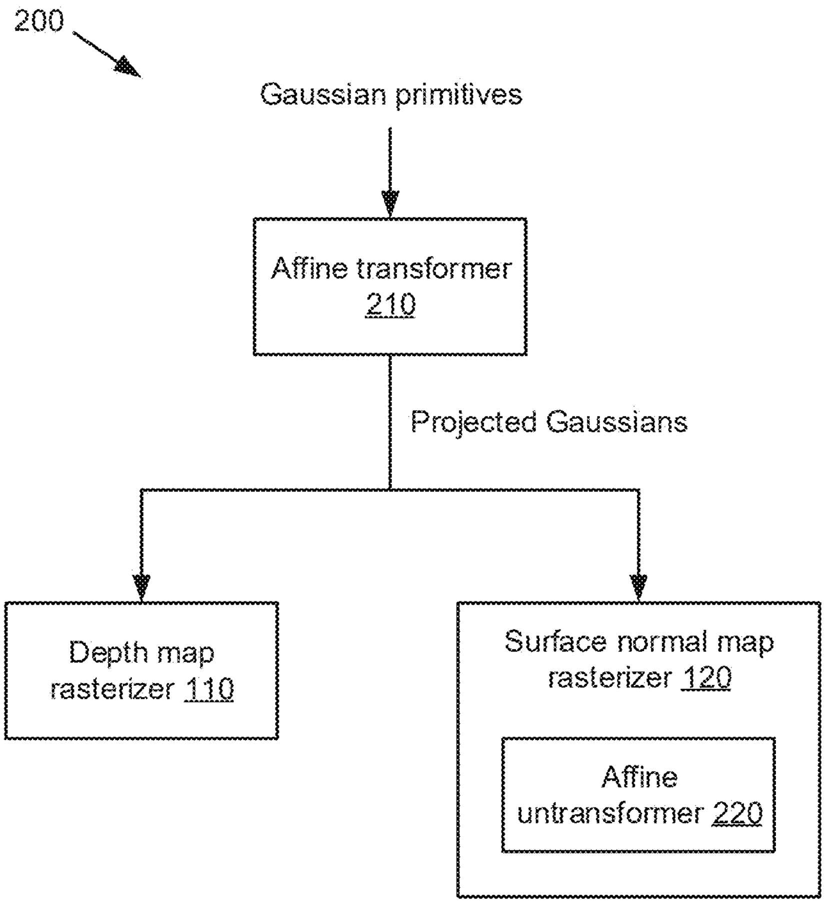

With reference now to FIG. 2, a block diagram of another system 200 that facilitates rasterizing depth in Gaussian Splatting is illustrated. Repetitive description of like parts described above with regard to other implementations is omitted for brevity. System 200 as shown in FIG. 2 includes an affine transformer 210, which can apply a local affine transformation to Gaussian primitives, e.g., Gaussian primitives generated by the Gaussian representation generator 10 shown in FIG. 1, from a Cartesian coordinate space (or simply a Cartesian space) to a non-Cartesian coordinate space (or simply a non-Cartesian space). As used herein, the Cartesian coordinate space can be referred to as a "camera space," and the non-Cartesian coordinate space can be referred to as a "ray space." An example camera space and ray space that can be used in this manner are described below with reference to FIG. 5.

As will be described in further detail below, the depth map rasterizer 110 shown in FIG. 2 can determine spatially varying depths within respective Gaussian primitives based on intersection points between light rays and the Gaussian primitives. To simplify associated computation, these intersection points can be determined in the non-Cartesian (ray) space, as will be described below.

As additionally shown in FIG. 2, the surface normal map rasterizer 120 can include an affine untransformer 220, which can reverse the affine transformation applied by the affine transformer 210 to again represent associated Gaussian primitives in the Cartesian coordinate space. This untransformation can then be utilized by the surface normal map rasterizer 120 to convert surface normal directions determined in the non-Cartesian coordinate space back to the Cartesian coordinate space. Operation of the surface normal map rasterizer 120 in this manner will be described in further detail below following a more detailed description of the depth map rasterizer 110, which will be given with respect to FIGS. 3-5.

In an implementation, system 200 can operate as an extension to standard Gaussian Splatting, which can represent a 3D scene via a set of translucent 3D Gaussians. Each 3D Gaussian can be defined as follows:

$$G(x) = e^{-(x-x_c)^T \Sigma^{-1} (x-x_c)}, \quad (1)$$

where $x_c \in \mathbb{R}^3$ is the Gaussian center and $\Sigma \in \mathbb{R}^{3\times3}$ is the covariance matrix. The covariance $\Sigma$ is parameterized by a scaling matrix S and rotation matrix R as $\Sigma = RSS^T R^T$.

Figure 3:
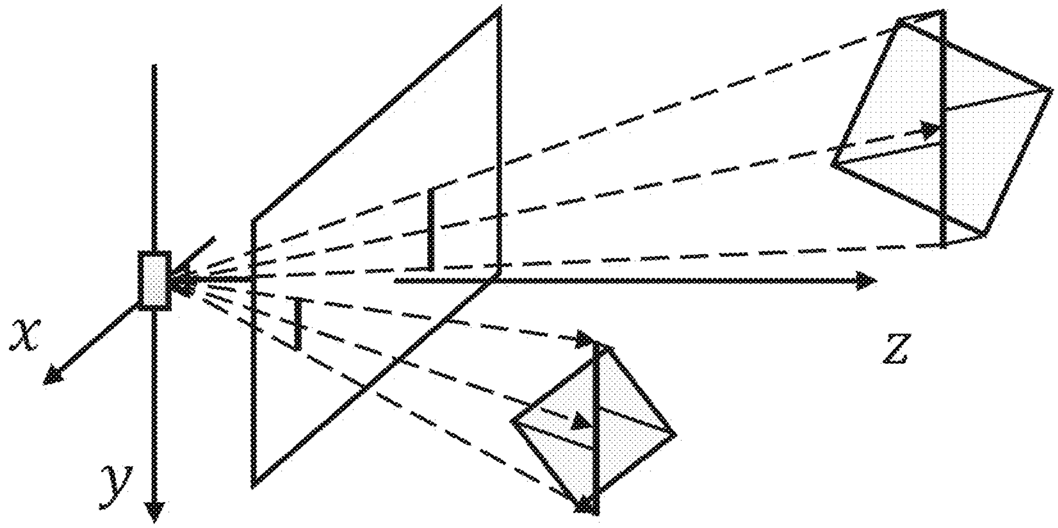
FIG. 3 is a diagram depicting a local affine projection that can be performed in accordance with various implementations described herein.
Figure 4:
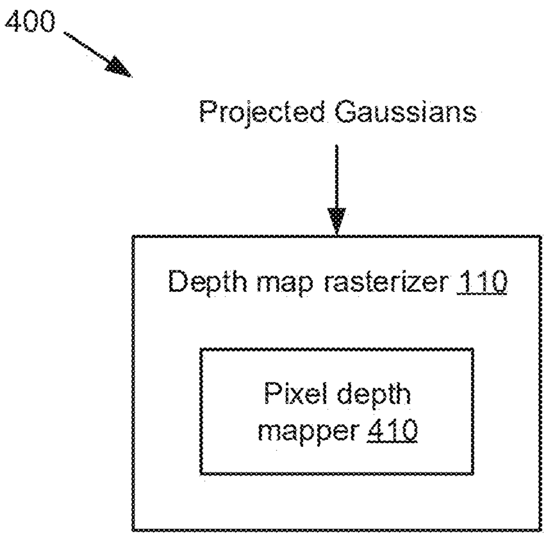
FIG. 4 is a block diagram of another system that facilitates rasterizing depth in Gaussian splatting in accordance with various implementations described herein.

Approximate Local Affine Projection. Gaussian Splatting approximates the perspective camera projection locally by an affine transformation for each 3D Gaussian to achieve efficient rasterized rendering, as illustrated in FIG. 3. The projected 2D Gaussian can be computed as follows:

$$\sum' = JW \sum W^T J^T, \quad (2)$$

where $\Sigma' \in \mathbb{R}^{3\times3}$ is the covariance matrix in the camera coordinate frame, W is the rotation matrix from the world coordinate system to the camera coordinate system, and J is the Jacobian of the perspective transformation. The 2D Gaussian covariance is obtained by skipping the last row and column of $\Sigma'$.

Alpha blending. Gaussian Splatting sorts the projected 2D Gaussians by their depth and computes the color at each pixel by α-blending, e.g., as follows:

$$c = \sum_{i \in N} c_i a_i \prod_{j=1}^{i-1} (1 - \alpha_j), \quad (3)$$

where c is the rendered pixel color, $c_i$ is the color of the i-th Gaussian kernel computed from its spherical harmonics coefficients and viewing direction, and $\alpha_i$ is the pixel translucency determined by the opacity of the i-th Gaussian kernel and the pixel's position.

Rasterization of Depth for Gaussian Splats

Standard Gaussian Splatting evaluates the depth of each 2D Gaussian by its center to sort them for alpha blending.

However, this constant depth per Gaussian splat cannot capture shape details. Therefore, as shown by system 400 in FIG. 4, a depth map rasterizer 110 as described herein can include a pixel depth mapper 410, which can compute a spatially varying depth within the projected 2D Gaussian, e.g., by utilizing a rasterized method for its efficient evaluation.

In an implementation, the pixel depth mapper 410 can define a point ($u_c$, $v_c$) as the center of a 2D Gaussian. For a pixel (u, v) covered by the projected Gaussian, the depth of the pixel can be computed as follows:

$$d = z_c + p\begin{pmatrix} \Delta u \\ \Delta v \end{pmatrix}, \tag{4}$$

where $z_c$ is the depth of the Gaussian center and $\Delta u = u_c - u$ and $\Delta v = v_c - v$ are the relative pixel positions. The 1×2 vector $p \in \mathbb{R}^2$ is determined by the Gaussian parameters and camera extrinsic parameters. This formulation enables rasterized computation of spatially varying depths within a projected Gaussian. This formulation is derived in detail below.

Depth under perspective projection. To make the derivation easier to understand, the associated concepts are first introduced in the camera coordinates with perspective projection. As shown via diagram 502 in FIG. 5, consider a light ray leaving the camera center o with unit direction v. A point on this ray is parameterized by the distance t to o, e.g., as follows:

$$x = 0 + tv. \tag{5}$$

The Gaussian value on the ray can be computed as a function of t, e.g., as follows:

$$G^1(t) = e^{-(o+tv-x_c)^T \Sigma^{-1} (o+tv-x_c)}. \tag{6}$$

According to Equation (6), the Gaussian value along the ray is a one-dimensional (1D) Gaussian function.

Next, the "intersection point" of the ray and the 3D Gaussian can be defined as the point that maximizes the 1D Gaussian function $G^1(t)$. As shown in diagram 502, the cross-hatched point is the intersection of the ray with the Gaussian splat. The distance t* between the intersection point and the camera center can be computed in closed-form by locating the maximum value of $G^1(t)$, e.g., as follows:

$$t^* = \frac{v^T \sum^{-1} (x_c - o)}{v^T \sum^{-1} v}. \tag{7}$$

Equation (7) implies that intersections of a 3D Gaussian and a bundle of light rays form a curved surface, where different pixels have different depth values of t* and different viewing directions v.

Depth under local affine projection. Next, the depth map rasterizer 110 can derive the depth of a pixel under the local affine projection, which is a projection model in which each 3D Gaussian undergoes an affine projection. This simplified projection model can allow for a rasterized method to compute the spatially varying depth of a projected Gaussian splat.

Figure 5:
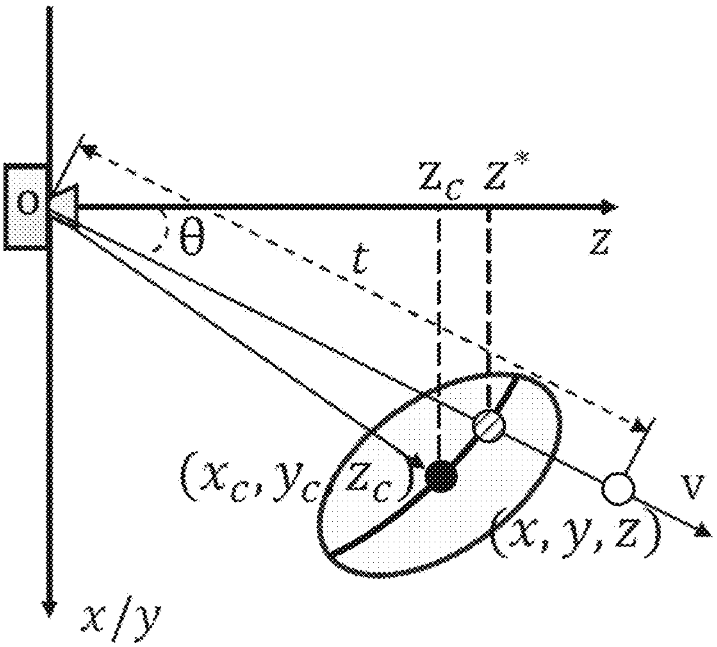
FIG. 5 is a diagram depicting example light ray intersections in Euclidean and non-Euclidean space that can be utilized in accordance with various implementations described herein.
Figure 5:
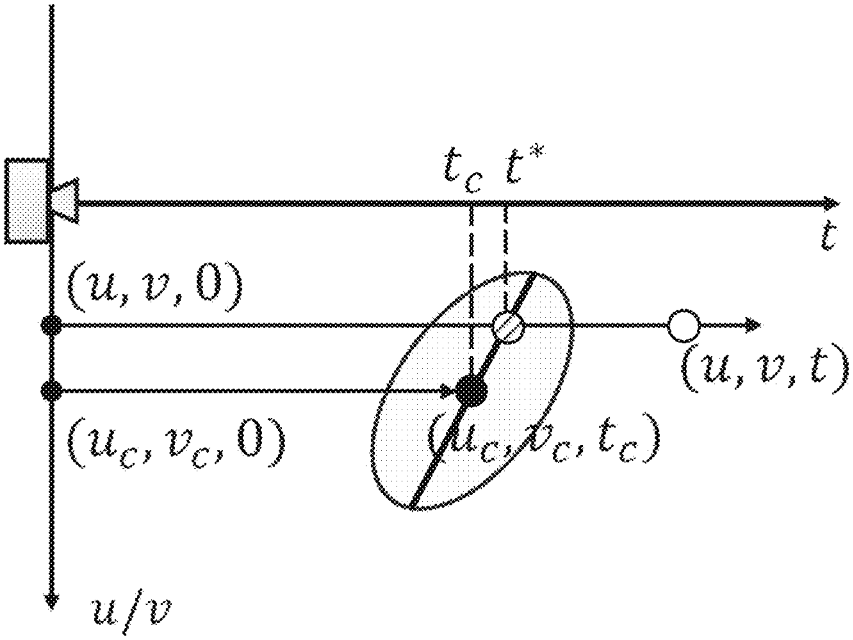

Under the local affine projection, each 3D Gaussian can undergo an affine projection locally, e.g., as shown in diagram 504 of FIG. 5. The coordinate system in diagram 504 can be referred to as the "ray space," while the coordinate system in diagram 502 can be referred to as the "camera space" for clarity of discussion.

Transformation from camera to ray space. The ray space shown in diagram 504 is a non-Cartesian coordinate system that enables simple derivation formulation. The unshaded point in diagram 502, e.g., $x=(x, y, z)^T$ in the camera space, is transformed to the unshaded point in diagram 504, e.g., $u=(u, v, t)^T$ in the ray space. The first two coordinates (u, v) are the image plane coordinates, and t represents the distance between the point and the uv-plane. In other words, $t=\sqrt{x^2+y^2+z^2}$. Points on a light ray share u and v coordinates but have varying distances t to the camera center. It is noted that the light ray direction v is normalized to $(0,0,1)^T$ in the ray space. As additionally shown in FIG. 5, the curved line within the represented Gaussian in diagram 502 and the straight line within the represented Gaussian in diagram 504 represent the set of intersections of the Gaussian with different light rays. As further shown by FIG. 5, while respective light rays originate from a common origin point in the Cartesian (camera) space, said light rays are parallel and oriented in a constant direction in the non-Cartesian (ray) space.

In addition, the Gaussian splats can also be transformed into the ray space. This can be done via the following Gaussian function:

$$G'(u) = e^{-(u-u_c)^T \Sigma'^{-1} (u-u_c)}, \tag{8}$$

Where u is a point in ray space, $u_c$ is the transformed center, and Σ' is the transformed covariance matrix. The transformed Gaussian center can be denoted as $u_c=(u_c, v_c, t_c)^T$. The transformed covariance matrix can be computed according to Equation (2) above.

Intersection in ray space. The intersection in ray space can be derived by locating the maximum value of Gaussian on the light ray. Similarly, in the ray space, a point is parameterized by its distance t to the uv-plane, e.g., as given as follows:

$$u = u_o + tv', \tag{9}$$

where $u_o=(u, v, 0)^T$ and $v'=(0,0,1)^T$. By substituting Equation (9) into Equation (8), the 1D Gaussian function defined on the light ray can be derived as follows:

$$G'^1(t) = e^{-(u_o+tv'-u_c)^T \Sigma'^{-1} (u_o+tv'-u_c)}. \tag{10}$$

Similarly, the maximum point can be located as follows:

$$t^* = \frac{v'^T \sum'^{-1} (u_c - u_o)}{v'^T \sum'^{-1} v'}. \tag{11}$$

While Equation (11) is similar to Equation (7), it is noted that the direction the direction v' in Equation (11) is a constant vector $(0,0,1)^T$. As a result, the values of $v'^T\Sigma'^{-1}v'$ and $v'^T\Sigma'^{-1}$ can be pre-computed for each Gaussian. In this way, the intersection point can be computed simply as follows:

$$t^* = \hat{q}(u_c - u_o), \quad (12)$$

where the 1×3 vector $\hat{q}$ is defined as follows:

$$\hat{q} = \frac{v'^T \sum'^{-1}}{v'^T \sum'^{-1} v'}. \quad (13)$$

Depth of intersection. The depth map rasterizer 110 can derive the depth value of the intersection point, i.e., the cross-hatched point in diagrams 502 and 504, as follows. As shown in diagram 502, t is the distance between the 3D point x and the camera center o. Accordingly, the depth of x can be expressed as follows:

$$d = \cos\theta\, t^*, \quad (14)$$

where θ is the angle between the light ray and principal axis of the camera. To simplify computation, θ can be approximated as $\theta_c$, which is the angle defined by the Gaussian center $x_c$. As a result, the depth of x becomes the following:

$$d = \cos\theta_c t^* = \frac{z_c}{t_c} t^* = \frac{z_c}{t_c}\hat{q}(u_c - u_o) = \hat{p}(u_c - u_o), \quad (15)$$

where $$\hat{p} = \frac{z_c}{t_c}\hat{q}$$

is a constant 1×3 vector for a fixed Gaussian splat.

Equation (15) as given above can be further reformulated as follows:

$$d = \hat{p}(u_c - u_o) = \hat{p}\begin{pmatrix} u_c - u \\ v_c - v \\ t_c \end{pmatrix} = \hat{p}\begin{pmatrix} 0 \\ 0 \\ t_c \end{pmatrix} + \hat{p}\begin{pmatrix} \Delta u \\ \Delta v \\ 0 \end{pmatrix}. \quad (16)$$

As will be proven in Section A of the appendix below, the following can additionally be obtained:

$$\hat{p}\begin{pmatrix} 0 \\ 0 \\ t_c \end{pmatrix} = z_c. \quad (17)$$

As a result, the third element of $\hat{p}$ can be skipped to obtain p in Equation (4). Accordingly, the depth map rasterizer 110 can utilize a rasterized method to compute the spatial varying depth for each pixel covered by a Gaussian splat, e.g., by projecting a Gaussian primitive onto an image plane, resulting in a two-dimensional Gaussian projection, and determining depths corresponding to respective pixels covered by the two-dimensional Gaussian projection in the image plane as a function of a depth of a center point of the Gaussian primitive and positions of the respective pixels on the image plane relative to the center point, as described above.

Rasterization of Normal for Gaussian Splats

Returning now to FIG. 2, the surface normal map rasterizer 120 can compute surface normal directions projected by a Gaussian splat as follows. As indicated by the line segment in diagram 504 in FIG. 5, the intersection points form a plane in ray space. Accordingly, the surface normal map rasterizer 120 can take the normal direction of the plane as that of the projected Gaussian. The surface normal map rasterizer 120 can then transform the normal vector from the ray space back to the camera space to compute the normal map. Stated another way, the surface normal map rasterizer 120 can determine a normal direction of a plane in non-Cartesian space (e.g., the ray space), and then the affine untransformer 220 of the surface normal map rasterizer 120 can reverse the local affine transformation applied by the affine transformer 210 as described above, resulting in conversion of the normal direction of the plane in the non-Cartesian space to a surface normal direction of a corresponding Gaussian primitive in the Cartesian space (e.g., the camera space), as follows.

Plane normal in ray space. The surface normal map rasterizer 120 can derive the plane equation in the ray space to get its normal direction. As will be shown in Section B of the appendix below, the intersection point in the ray space can be given as follows:

$$u = \begin{pmatrix} u \\ v \\ t^* \end{pmatrix} = \begin{pmatrix} u_c \\ v_c \\ t_c \end{pmatrix} + \begin{pmatrix} -\Delta u \\ -\Delta v \\ (\Delta u \;\; \Delta v)q^T \end{pmatrix}, \quad (18)$$

where q is a 1×2 vector, which has the first two components of $\hat{q}$ as given in Equation (13). It is noted that $(u_c, v_c, t_c)^T$ is the Gaussian center $u_c$ and is a constant vector. As a result, all of the intersection points between the Gaussian splat and a bundle of light rays should lie on a plane in the ray space. The plane equation can be derived from Equation (18) as follows:

$$(u - u_c) = \begin{pmatrix} -\Delta u \\ -\Delta v \\ (\Delta u \;\; \Delta v)q^T \end{pmatrix}, \quad (19)$$

$$(q \;\; 1)(u - u_c) = (q \;\; 1)\begin{pmatrix} -\Delta u \\ -\Delta v \\ (\Delta u \;\; \Delta v)q^T \end{pmatrix} = 0. \quad (20)$$

According to Equation (20), the vector (q 1) is the normal of the plane formed by all the intersection points. The normal pointing towards the image plane can be chosen, which can be expressed as follows:

$$n' = -(q \;\; 1)^T. \quad (21)$$

Here, n' is a 3×1 vector since q is a 1×2 vector. The denotation ' represents parameters in the ray space.

Plane normal in camera space. With the normal direction derived in the ray space, the affine untransformer 220 can transform the normal direction back to the camera space by the local affine transformation, e.g., as follows:

$$n = J^T n', \tag{22}$$

where J is the local affine matrix. After transformation, the vector n can be normalized to unit length.

In an implementation, the rasterized depth and normal maps described above with reference to FIG. 2 can be derived from general 3D Gaussian splats under the local affine transformation assumption, which is assumed in standard Gaussian Splatting. As a result, the above techniques can be directly integrated into existing methods utilizing 3D Gaussian Splatting.

Loss Functions

Figure 6:
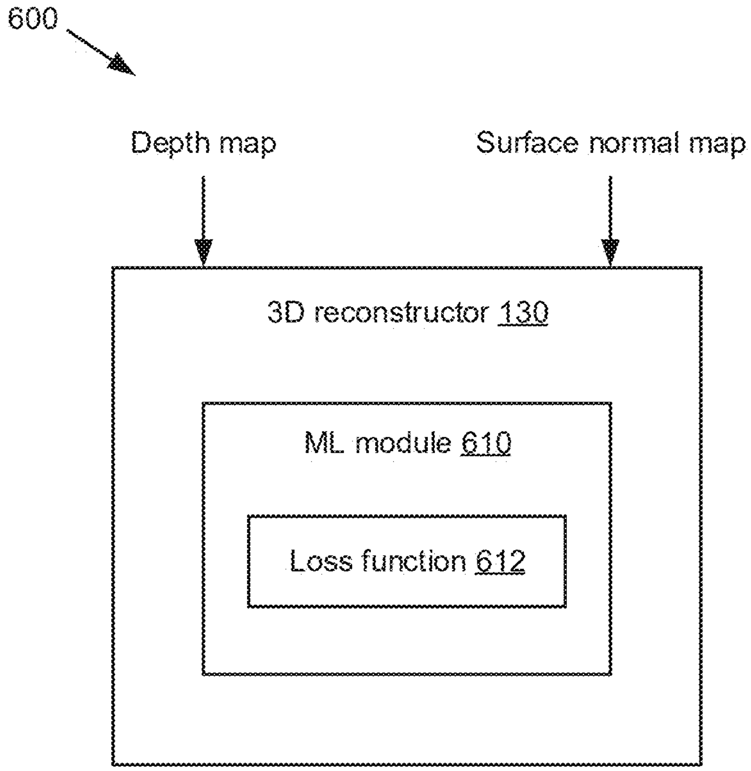
FIG. 6 is a block diagram of still another system that facilitates rasterizing depth in Gaussian splatting in accordance with various implementations described herein.

Referring now to FIG. 6, a block diagram of another system 600 that facilitates rasterizing depth in Gaussian Splatting is illustrated. Repetitive description of like parts described above with regard to other implementations is omitted for brevity. System 600 as shown in FIG. 6 includes a 3D reconstructor 130, which can generate a 3D reconstruction of a 3D object or scene based on an output of a machine learning (ML) model, e.g., a ML model managed by a ML module 610 of the 3D reconstructor 130. As will be described below, the ML model can be trained using a loss function 612, which can be a function of a weighted sum of a depth distortion loss associated with the 3D reconstruction and a normal consistency loss associated with the 3D reconstruction.

Even with the depth and normal maps derived as described above, Gaussian Splatting cannot recover shape details if it is only trained with a photometric supervision parameter $\mathcal{L}_c$ that minimizes the difference between rendered and input images. To address this, the 3D reconstructor 130 shown in FIG. 6 can modify the loss function 612 to apply additional depth distortion loss and normal consistency loss. These two terms can be defined as follows.

Depth distortion loss. The depth distortion loss can encourage different Gaussian splats on a ray to be close to each other by minimizing the disparity of their depths, e.g., as follows:

$$\mathcal{L}_d = \sum_{i,j} \omega_i \omega_j (d_i - d_j)^2, \tag{23}$$

where $$\omega_i = \alpha_i \prod_{j=1}^{i-1} (1 - \alpha_j)$$

is the blending weight of the i-th Gaussian, and $d_i$ is the depth of said Gaussian.

Normal consistency loss. The normal consistency loss can ensure the Gaussian splats align with the surface by measuring the consistency between normal directions computed from the Gaussian and the depth map, respectively. This can be expressed as follows:

$$\mathcal{L}_n = \sum_i \omega_i (1 - n_i^T \tilde{n}), \tag{24}$$

where ñ is the surface normal direction obtained by applying finite-difference on the depth map.

As a result of the above, the final training loss $\mathcal{L}$ can be expressed as follows:

$$\mathcal{L} = \mathcal{L}_c + w_d \mathcal{L}_d + w_n \mathcal{L}_n. \tag{25}$$

Applications

Figure 7:
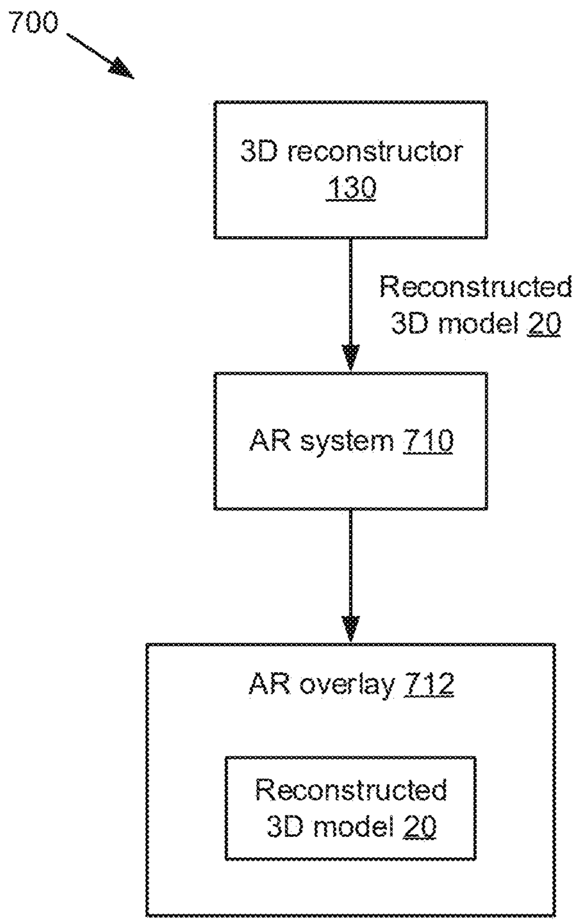
FIGS. 7-8 are block diagrams of respective systems that incorporate reconstructed three-dimensional objects as generated in accordance with various implementations described herein into respective practical applications.

Turning next to FIG. 7, a block diagram of a system 700 that incorporates reconstructed 3D objects as generated in accordance with various implementations described herein into a practical application, namely an augmented reality (AR) system 710, is illustrated. Repetitive description of like parts described above with regard to other implementations is omitted for brevity. As shown in FIG. 7, a 3D reconstructor 130 can be used to generate a reconstructed 3D model 20, e.g., based on rasterized depth maps, rasterized surface normal maps, and/or other information as described above. The reconstructed 3D model 20 can be provided to an AR system 710, which can then display the reconstructed 3D model 20 in an AR overlay 712. In various implementations, the AR overlay 712 can be rendered on a display screen associated with a smartphone, tablet computer, or other similar device; a wearable device such as smart goggles, and/or any other suitable device(s). Also or alternatively, the AR overlay 712 can display the reconstructed 3D model 20, either alone or in combination with other 3D models or other computer-generated graphics, together with a live feed from a camera or other image capture device, e.g., according to one or more AR techniques known in the art.

Figure 8:
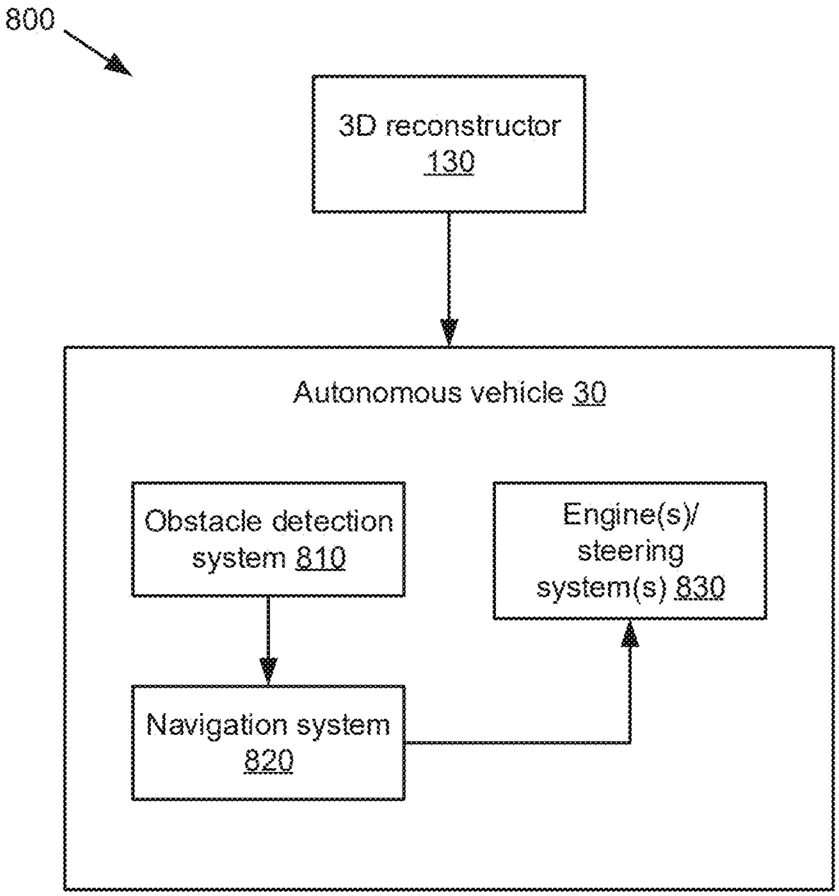

Referring now to FIG. 8, a block diagram of another system 800 that incorporates reconstructed 3D objects into a practical application, here a navigation system for an autonomous vehicle 30, is shown. Repetitive description of like parts described above with regard to other implementations is omitted for brevity. As FIG. 8 illustrates, a 3D reconstructor 130 as described above can convey a reconstructed model of a 3D scene or object to one or more systems of an autonomous vehicle 30 (e.g., a unmanned aerial vehicle (UAV) or drone, an autonomous land-based or water-based robot, a self-driving automobile, etc.), such as an obstacle detection system 810. Based on information pertaining to the reconstructed 3D scene or object, the autonomous vehicle 30 can alter a navigation route associated with movement of the autonomous vehicle 30 through an environment. For instance, a reconstructed 3D scene can be provided to an obstacle detection system 810 of the autonomous vehicle, which can in turn cause a navigation system 820 of the autonomous vehicle to alter a navigation route. The navigation system 820 can then engage one or more other systems 830 of the autonomous vehicle 30, such as engines, steering systems, or the like, to facilitate movement of the autonomous vehicle 30 according to the modified route.

Experimental Results

In the following section, the performance of the techniques described herein, referred to in this section as Rasterized Depth GS or RaDe-GS, is evaluated on both novel view synthesis and 3D reconstruction with standard benchmark datasets. These results are then compared with state-of-the-art (SOTA) implicit and explicit approaches.

Experimental setup. For the following, RaDe-GS was built upon the public code of 3D GS, with customized CUDA kernels implemented for the rasterized depth, normal map computation, and regularization terms.

The default parameters of 3D GS are used along with the 3D filter proposed in Mip-Splatting and the densification approach proposed by AbsGS. Densification is stopped at 15 k iterations, and the associated models are optimized for 30 k iterations. In the following experiments, weighting values of $w_d$=100 and $w_n$=5 are used, and the gradient propagation of the blending weight w is detached when calculating depth distortion loss. Depth maps are rendered for all training views, and then TSDF is adopted for mesh extraction. The experiments described herein are conducted on a single NVIDIA H800 GPU.

With regard to the datasets used, the surface reconstruction experiments are conducted on subsets of the DTU and TNT datasets. With the camera poses provided by the datasets, sparse point clouds of each scene are generated for initialization.

For novel view synthesis, the Mip-NeRF360 dataset and the Synthetic-NeRF dataset were used. The Mip-NeRF360 dataset contains large indoor and outdoor scenes, while the Synthetic-NeRF contains object-level scenes with challenging reflections and detailed shapes.

To facilitate comparison with previous methods, Chamfer Distance (CD) is used for the DTU dataset, and F1-score is used for the TNT dataset. To evaluate the quality of novel view synthesis, PSNR, SSIM and LIPIPS are used as metrics.

As detailed below, RaDe-GS is compared with the SOTA Gaussian Splatting methods for surface reconstruction, including GOF, SuGaR, 2D GS, and 3D GS. RaDe-GS is also compared with NeRF-based implicit methods, including Vo1SDF, NeuS, and NeuraLangelo. These methods adopt a Signed Distance Function (SDF) to represent the scene and transform the SDF to opacity for ray tracing based volume rendering.

Figure 9A:
FIGS. 9A-9C and 10 are diagrams depicting example reconstructions of three-dimensional scenes in accordance with various implementations described herein.
Figure 9A:
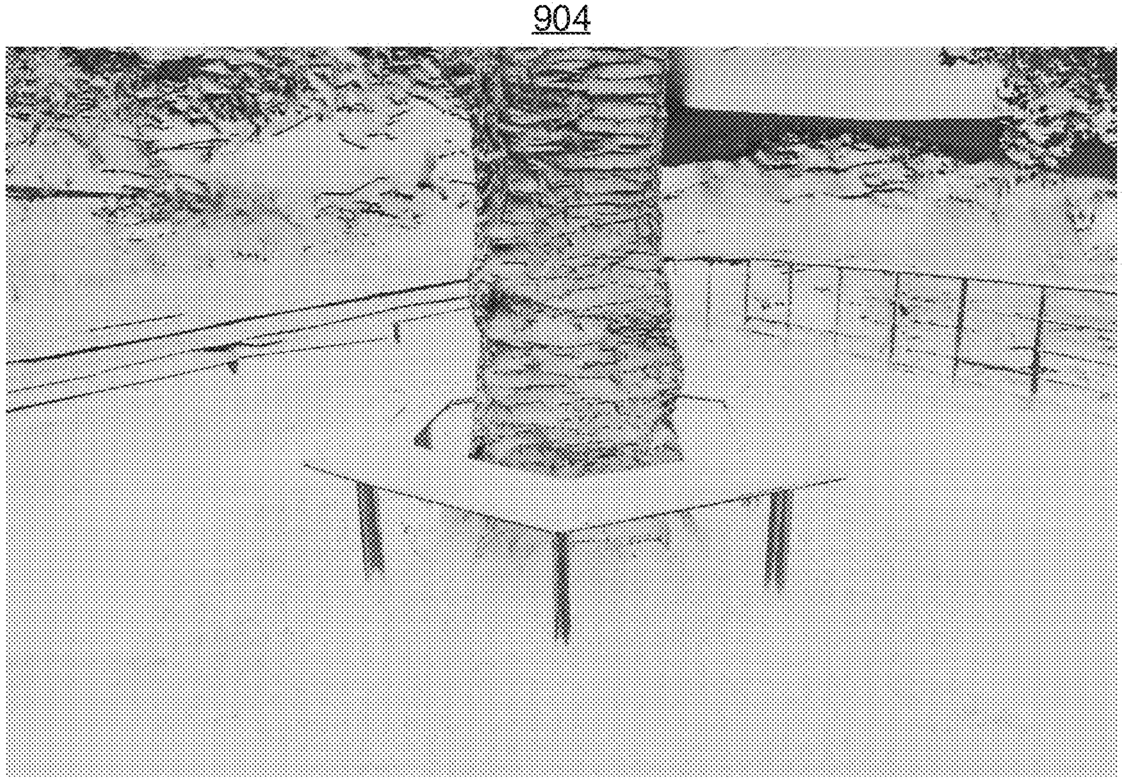
Figure 9B:
Figure 9B:
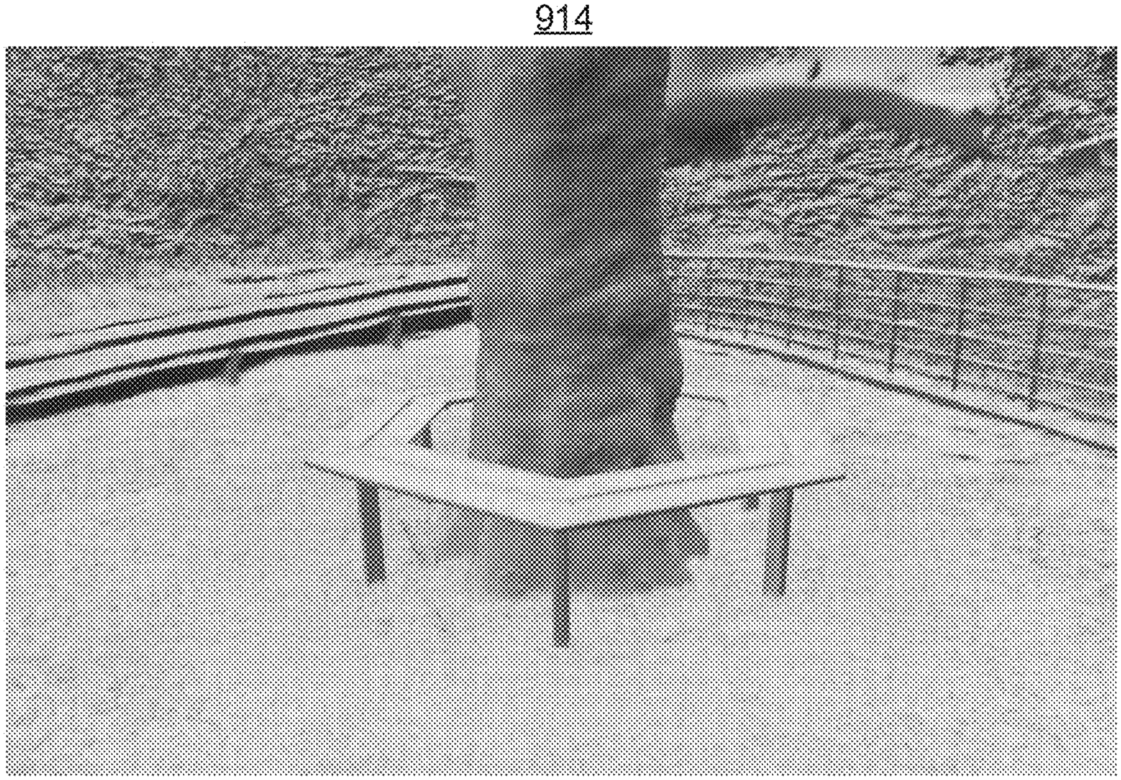
Figure 9C:
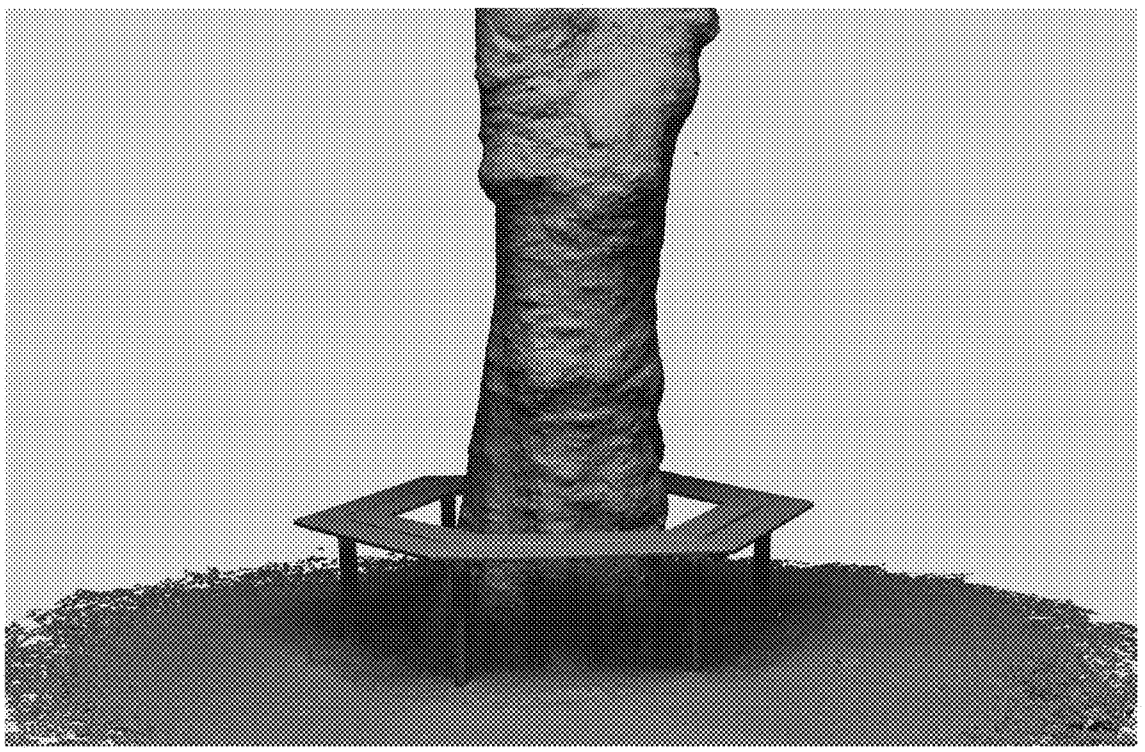

Comparison. Based on the above experimental setup, FIGS. 9A-9C show various diagrams depicting reconstruction results for 2D GS and RaDe-GS. In particular, diagrams 902 and 904 in FIG. 9A show a novel view rendering and 3D reconstruction, respectively, according to 2D GS, diagrams 912 and 914 in FIG. 9B show a novel view rendering and 3D reconstruction, respectively, according to RaDe-GS, and diagram 920 in FIG. 9C shows an example extracted 3D mesh produced via RaDe-GS. As shown in FIGS. 9A-9C, RaDe-GS achieves high-quality 3D shape reconstruction while maintaining excellent training and rendering efficiency. In contrast, forcing Gaussian splats to be planar as in 2D GS produces blurry novel view rendering and noisy 3D shapes.

Figure 10:
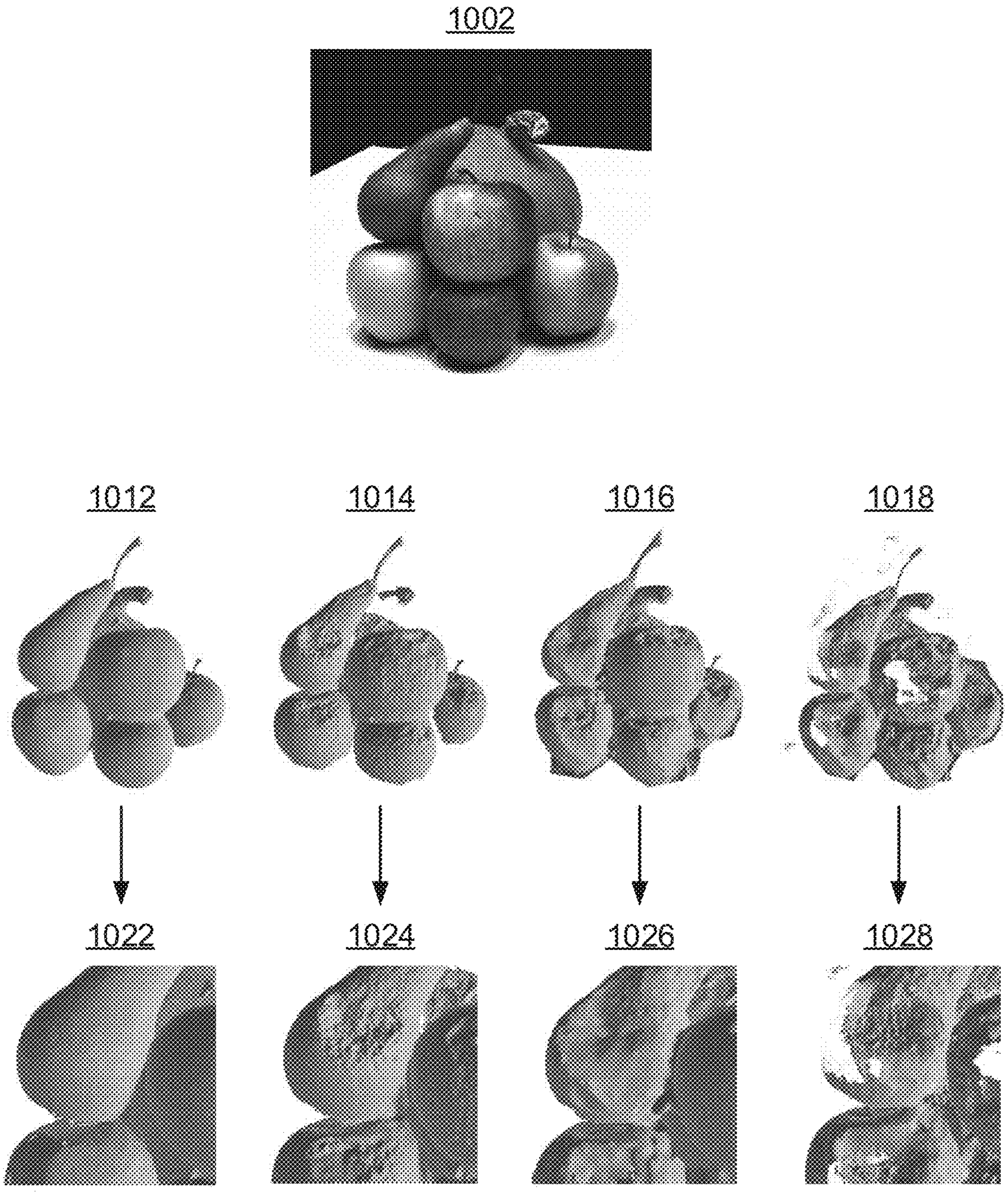

Surface reconstruction comparison. RaDe-GS, as performed as described herein, is compared with existing methods on the DTU and TNT datasets. As shown in Table 1 below, RaDe-GS outperforms all GS-based methods and achieves competitive results with NeuraLangelo in terms of Chamfer Distance error. (For space purposes, NeuraLangelo is abbreviated in the tables below as NA.) Additionally, FIG. 10 visualizes some results generated by different GS-based methods for a given 3D scene 1002. More particularly, reconstruction 1012 was generated via RaDe-GS, reconstruction 1014 was constructed via 2D GS, reconstruction 1016 was generated via SuGaR, and reconstruction 1018 was constructed via 3D GS. Views 1022, 1024, 1026, and 1028 provide a more detailed view of corresponding portions of reconstructions 1012, 1014, 1016, and 1018, respectively. As shown by FIG. 10, RaDe-GS as described herein produces smooth and precise shapes. In contrast, 3D GS generates noisy meshes due to the biased depth rendering. At the same time, 2D GS and SuGaR tend to be unstable at the specular and highlight areas, thus producing inaccurate surface prediction, while RaDe-GS is more robust to these problems.

TABLE 1

Quantitative comparison on the DTU dataset.

| | Implicit Techniques | | | | Explicit Techniques | | | | |
|---|---|---|---|---|---|---|---|---|---|
| ID# | NeRF | VolSDF | NeuS | NA | 3D GS | SuGaR | 2D GS | GOF | RaDe-GS |
| 24 | 1.90 | 1.14 | 1.00 | 0.37 | 2.14 | 1.47 | 0.48 | 0.50 | 0.49 |
| 37 | 1.60 | 1.26 | 1.37 | 0.72 | 1.53 | 1.33 | 0.91 | 0.82 | 0.71 |
| 40 | 1.85 | 0.81 | 0.93 | 0.35 | 2.08 | 1.13 | 0.39 | 0.37 | 0.33 |
| 55 | 0.58 | 0.49 | 0.43 | 0.35 | 1.68 | 0.61 | 0.39 | 0.37 | 0.37 |
| 63 | 2.28 | 1.25 | 1.10 | 0.87 | 3.49 | 2.25 | 1.01 | 1.12 | 0.87 |
| 65 | 1.27 | 0.70 | 0.65 | 0.54 | 2.21 | 1.71 | 0.83 | 0.74 | 0.79 |
| 69 | 1.47 | 0.72 | 0.57 | 0.53 | 1.43 | 1.15 | 0.81 | 0.73 | 0.77 |
| 83 | 1.67 | 1.29 | 1.48 | 1.29 | 2.07 | 1.63 | 1.36 | 1.18 | 1.22 |
| 97 | 2.05 | 1.18 | 1.09 | 0.97 | 2.22 | 1.62 | 1.27 | 1.29 | 1.26 |
| 105 | 1.07 | 0.70 | 0.83 | 0.73 | 1.75 | 1.07 | 0.76 | 0.68 | 0.70 |
| 106 | 0.88 | 0.66 | 0.52 | 0.47 | 1.79 | 0.79 | 0.70 | 0.77 | 0.65 |
| 110 | 2.53 | 1.08 | 1.20 | 0.74 | 2.55 | 2.45 | 1.40 | 0.90 | 0.85 |
| 114 | 1.06 | 0.42 | 0.35 | 0.32 | 1.53 | 0.98 | 0.40 | 0.42 | 0.33 |
| 118 | 1.15 | 0.61 | 0.49 | 0.41 | 1.52 | 0.88 | 0.76 | 0.66 | 0.66 |
| 122 | 0.96 | 0.55 | 0.54 | 0.43 | 1.50 | 0.79 | 0.52 | 0.49 | 0.44 |
| Mean | 1.49 | 0.86 | 0.84 | 0.61 | 1.96 | 1.33 | 0.80 | 0.74 | 0.69 |

Table 2 as provided below compares RaDe-GS as described herein with other methods on the TNT dataset. Again, RaDe-GS outperforms all 3D GS-based methods. It is noted that, due to memory constraints associated with voxel resolution, the F1-score of RaDe-GS is lower than NeuraLangelo and close to NeuS. However, as additionally noted in Table 2, RaDe-GS outperforms implicit techniques in other measures, such as computation time.

TABLE 2

Quantitative comparison on the TNT dataset.

| | Implicit Techniques | | | Explicit Techniques | | | | |
|---|---|---|---|---|---|---|---|---|
| ID | NeuS | Geo-Neus | NA | SuGaR | 3D GS | 2D GS | GOF | RaDe-GS |
| Barn | 0.29 | 0.33 | 0.70 | 0.14 | 0.13 | 0.36 | 0.37 | 0.43 |
| Caterpillar | 0.29 | 0.26 | 0.36 | 0.16 | 0.08 | 0.23 | 0.21 | 0.26 |
| Courthouse | 0.17 | 0.12 | 0.28 | 0.08 | 0.09 | 0.13 | 0.11 | 0.11 |
| Ignatius | 0.83 | 0.72 | 0.89 | 0.33 | 0.04 | 0.44 | 0.63 | 0.73 |
| Meetingroom | 0.45 | 0.45 | 0.48 | 0.26 | 0.19 | 0.26 | 0.50 | 0.53 |
| Mean | 0.38 | 0.35 | 0.50 | 0.19 | 0.09 | 0.30 | 0.34 | 0.37 |
| Time | >24 h | >24 h | >24 h | >1 h | 14.3 m | 34.2 m | 1 h | 17.8 m |

Computational efficiency comparison. As noted above, Table 2 additionally provides the training time of different methods. In general, GS-based explicit methods are much more computationally efficient than implicit NeRF-based methods. RaDe-GS as described herein reconstructs a scene in about 17.8 minutes, while all implicit methods take more than 24 hours. 2D GS takes 34 minutes, nearly twice as long as RaDe-GS. GOF is even slower, taking one hour for training, which can be attributed to its time-consuming ray tracing technique.

Novel view synthesis comparison. RaDe-GS as described herein was further compared against previous methods on the Mip-NeRF360 and Synthetic NeRF datasets to evaluate their novel view synthesis capability. Table 3 and Table 4 as provided below present quantitative results. As can be seen from these tables, RaDe-GS achieves the highest average PSNR on the Synthetic NeRF dataset and gets the highest score in most metrics on the Mip-NeRF360 dataset. In comparison, the 2D GS and SuGaR methods generate poorer novel view rendering than the standard 3D GS, as shown in Table 3 and Table 4. This comparison suggests that the planar Gaussian constraints adopted in 2D GS and SuGaR hurt model performance in representing complicated scenes. In contrast, RaDe-GS keeps the original 3D GS and achieves better data representation and novel view synthesis results.

TABLE 3

Quantitative comparison on the Mip-NeRF 360 dataset.

| | Outdoor Scene | | | Indoor Scene | | |
|---|---|---|---|---|---|---|
| Technique | PSNR ↑ | SSIM ↑ | LPIPS ↓ | PSNR ↑ | SSIM ↑ | LPIPS ↓ |
| NeRF | 21.46 | 0.458 | 0.515 | 26.84 | 0.790 | 0.370 |
| Deep Blending | 21.54 | 0.524 | 0.364 | 26.40 | 0.844 | 0.261 |
| Instant NGP | 22.90 | 0.566 | 0.371 | 29.15 | 0.880 | 0.216 |
| MipNeRF360 | 23.19 | 0.616 | 0.343 | 27.80 | 0.855 | 0.271 |
| Mobile-NeRF | 21.95 | 0.470 | 0.470 | — | — | — |
| BakedSDF | 22.47 | 0.585 | 0.349 | 27.06 | 0.836 | 0.258 |
| SuGaR | 22.93 | 0.629 | 0.356 | 29.43 | 0.906 | 0.225 |
| BOG | 23.94 | 0.680 | 0.263 | 27.71 | 0.873 | 0.227 |
| 3D GS | 24.64 | 0.731 | 0.234 | 30.41 | 0.920 | 0.189 |
| Mip-Splatting | 24.65 | 0.729 | 0.245 | 30.90 | 0.921 | 0.194 |
| 2D GS | 24.21 | 0.709 | 0.276 | 30.10 | 0.913 | 0.211 |
| GOF | 24.82 | 0.750 | 0.202 | 30.79 | 0.924 | 0.184 |
| RaDe-GS | 25.17 | 0.764 | 0.199 | 30.74 | 0.928 | 0.165 |

TABLE 4

PSNR scores for Synthetic NeRF.

| | Mic | Chair | Ship | Materials | Lego | Drums | Ficus | Hotdog | Avg. |
|---|---|---|---|---|---|---|---|---|---|
| Plenoxels | 33.26 | 33.98 | 29.62 | 29.14 | 34.10 | 25.35 | 31.83 | 36.81 | 31.76 |
| INGP-Base | 36.22 | 35.00 | 31.10 | 29.78 | 36.39 | 26.02 | 33.51 | 37.40 | 33.18 |
| Mip-NeRF | 36.51 | 35.14 | 30.41 | 30.71 | 35.70 | 25.48 | 33.29 | 37.48 | 33.09 |
| Point-NeRF | 35.95 | 35.40 | 30.97 | 29.61 | 35.04 | 26.06 | 36.13 | 37.30 | 33.30 |
| 3DGS | 35.36 | 35.83 | 30.80 | 30.00 | 35.78 | 26.15 | 34.87 | 37.72 | 33.32 |
| 2DGS | 34.70 | 34.87 | 30.29 | 29.56 | 34.32 | 25.75 | 35.08 | 36.21 | 32.59 |
| GOF | 35.81 | 36.34 | 30.71 | 30.19 | 35.64 | 26.21 | 35.25 | 37.54 | 33.46 |
| RaDe-GS | 35.46 | 36.46 | 31.35 | 30.34 | 35.75 | 26.29 | 35.37 | 37.76 | 33.60 |

Appendix A—Details on Ray Space Depth

In this section, additional derivation of the depth rasterization described above is provided. In the above description. Gaussian depth is formulated as follows:

$$d = z_c + p\begin{pmatrix}\Delta u \\ \Delta v\end{pmatrix}, \tag{26}$$

where $z_c$ is the depth of the Gaussian center and $\Delta u=u_c-u$ and $\Delta v=v_c-v$ are the relative pixel positions. A derivation for the second term $$p\begin{pmatrix}\Delta u \\ \Delta v\end{pmatrix}$$

is provided above, and the following relates to derivation of the first term $z_c$.

In Equation (16) above, the depth of a Gaussian is divided into two parts:

$$d = \hat{p}\begin{pmatrix}0 \\ 0 \\ t_c\end{pmatrix} + \hat{p}\begin{pmatrix}\Delta u \\ \Delta v \\ 0\end{pmatrix}, \tag{27}$$

where $\hat{p}$ is in the following form:

$$\hat{p} = \frac{z_c}{t_c}\frac{v'^T\sum'^{-1}}{v'^T\sum'^{-1}v'}, \tag{28}$$

where $t_c$ is the distance from the camera center to the Gaussian center, $\Sigma'$ is the Gaussian covariance in ray space, and $v'=(0,0,1)^T$ is a constant vector in ray space.

Next, the term $\hat{p}(0,0,t_c)^T$ from Equation (27) can be simplified as follows. By substituting Equation (28) into the first part of Equation (27), the following can be obtained:

$$\hat{p}\begin{pmatrix}0 \\ 0 \\ t_c\end{pmatrix} = \frac{z_c}{t_c}\frac{v'^T\sum'^{-1}}{v'^T\sum'^{-1}v'}\begin{pmatrix}0 \\ 0 \\ t_c\end{pmatrix} = \frac{z_c}{t_c}\frac{v'^T\sum'^{-1}}{v'^T\sum'^{-1}v'}(t_c v') = \frac{z_c}{t_c}\frac{v'^T\sum'^{-1}v'}{v'^T\sum'^{-1}v'}t_c = z_c. \tag{29}$$

Appendix B—Details on Gaussian Normal

In this section, further derivation of Equation (18) above is provided. Given image plane coordinates (u, v), a ray from (u, v) intersects with a Gaussian on the point u, as follows:

$$u = \begin{pmatrix}u \\ v \\ t^*\end{pmatrix}. \tag{30}$$

As shown above, $$t^* = \frac{t_c}{z_c}d,$$

and d is shown in Equation (26) above. From this, the following can be obtained:

$$u = \begin{pmatrix}u \\ v \\ t^*\end{pmatrix} = \begin{pmatrix}u \\ v \\ \frac{t_c}{z_c}d\end{pmatrix} = \begin{pmatrix}u_c-\Delta u \\ v_c-\Delta v \\ t_c+(\Delta u\ \ \Delta v)q^T\end{pmatrix} = \begin{pmatrix}u_c \\ v_c \\ t_c\end{pmatrix} + \begin{pmatrix}-\Delta u \\ -\Delta v \\ (\Delta u\ \ \Delta v)q^T\end{pmatrix}, \tag{31}$$

where $$q = \frac{t_c}{z_c}p.$$

Since, per Equation (15), $$\hat{q} = \frac{t_c}{z_c}\hat{p},$$

and p contains the first two components of $\hat{p}$, q is equivalent to $\hat{q}$ without the last component.

Figure 11:
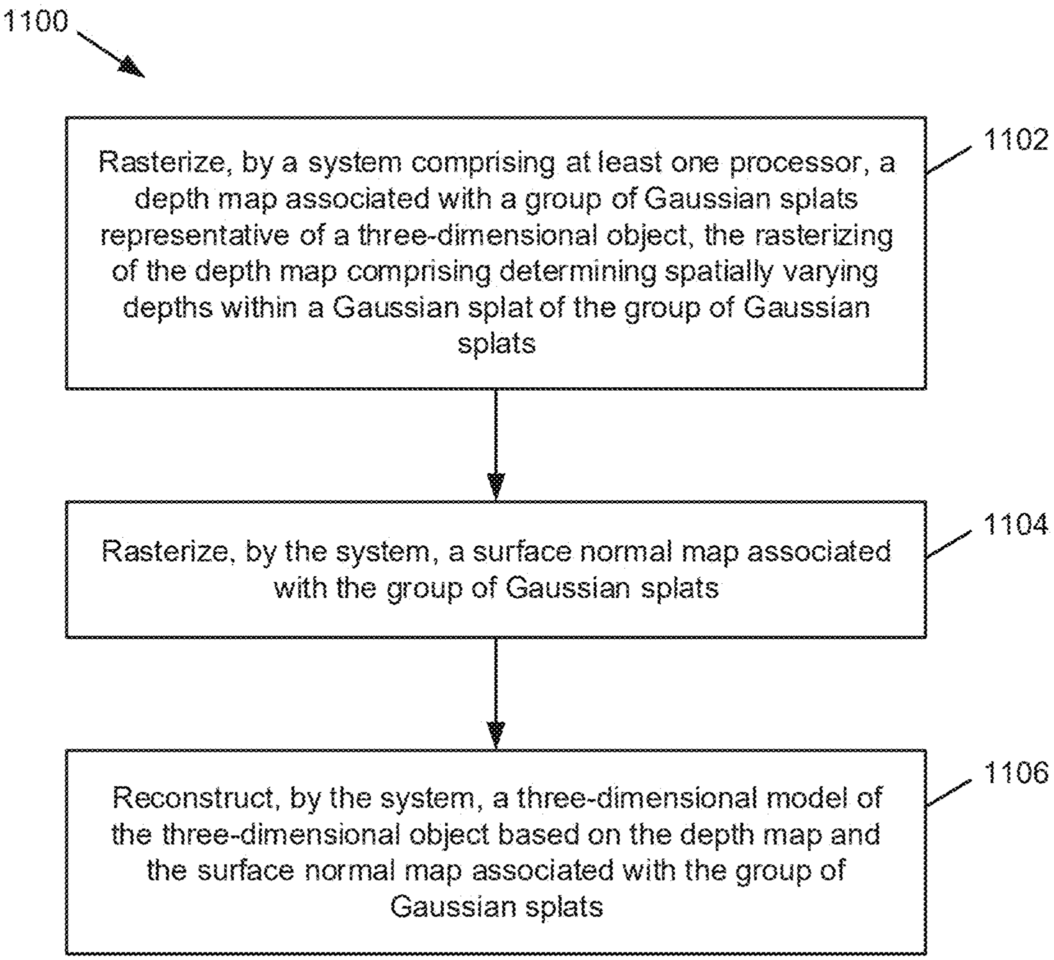
FIGS. 11-12 are flow diagrams of respective methods that facilitate rasterizing depth in Gaussian splatting in accordance with various implementations described herein.

Referring now to FIG. 11, a flow diagram of a method 1100 that facilitates rasterizing depth in Gaussian splatting is illustrated. At 1102, a system comprising at least one processor can rasterize (e.g., by a depth map rasterizer 110) a depth map associated with a group of Gaussian splats representative of a 3D object. Rasterizing the depth map as performed at 1102 can include determining spatially varying depths within a Gaussian splat of the group of Gaussian splats.

At 1104, the system can rasterize (e.g., by a surface normal map rasterizer 120) a surface normal map associated with the group of Gaussian splats.

At 1106, the system can reconstruct (e.g., by a 3D reconstructor 130) a 3D model of the 3D object based on the depth map rasterized at 1102 and the surface normal map rasterized at 1104.

Figure 12:
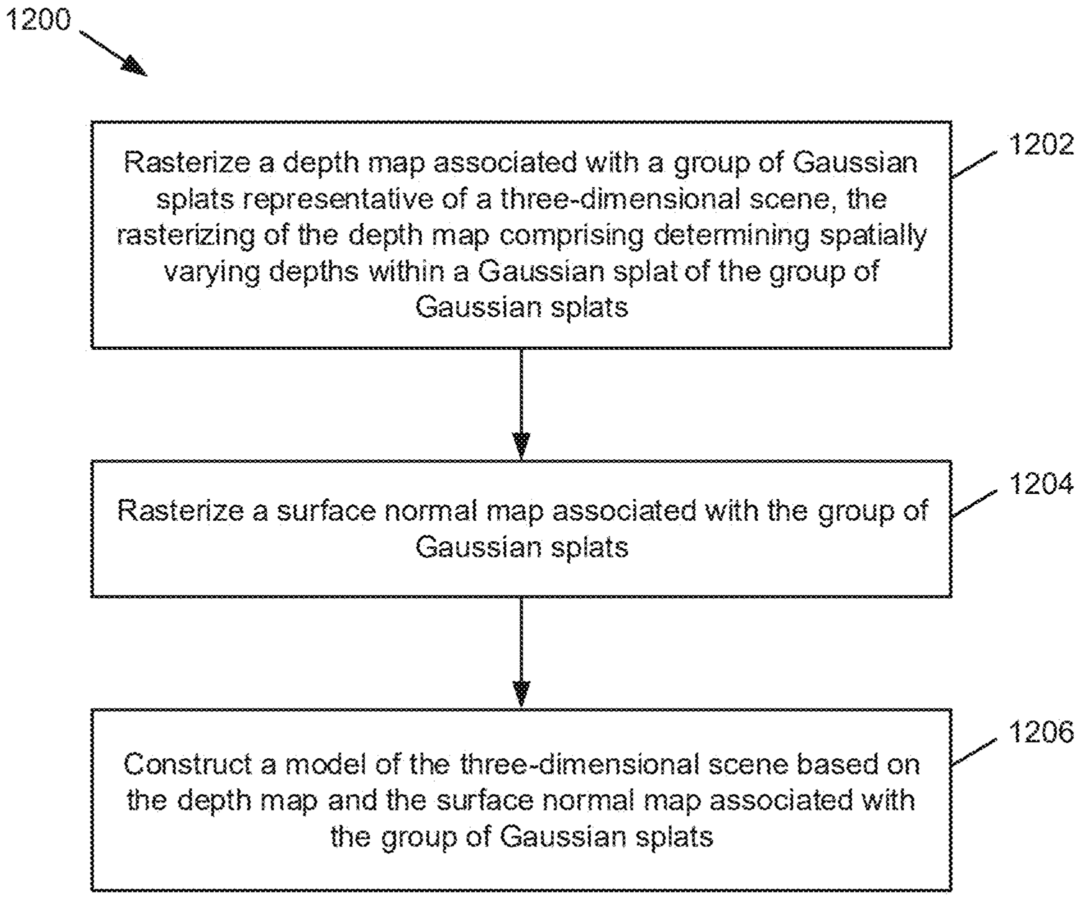

Referring next to FIG. 12, a flow diagram of a method 1200 that can be performed by at least one processor, e.g., based on machine-executable instructions stored on a non-transitory machine-readable medium, is illustrated. An example of a computer architecture, including a processor and non-transitory media, that can be utilized to implement method 1200 is described below with respect to FIG. 13.

Method 1200 can begin at 1202, in which the at least one processor can rasterize a depth map associated with a group of Gaussian splats representative of a 3D scene, the rasterizing of the depth map including determining spatially varying depths within a Gaussian splat of the group of Gaussian splats.

At 1204, the at least one processor can rasterize a surface normal map associated with the group of Gaussian splats.

At 1206, the at least one processor can construct a model of the 3D scene based on the depth map and the surface normal map associated with the group of Gaussian splats.

FIGS. 11-12 as described above illustrate methods in accordance with certain embodiments of this disclosure. While, for purposes of simplicity of explanation, the methods have been shown and described as series of acts, it is to be understood and appreciated that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain embodiments of this disclosure.

Figure 13:
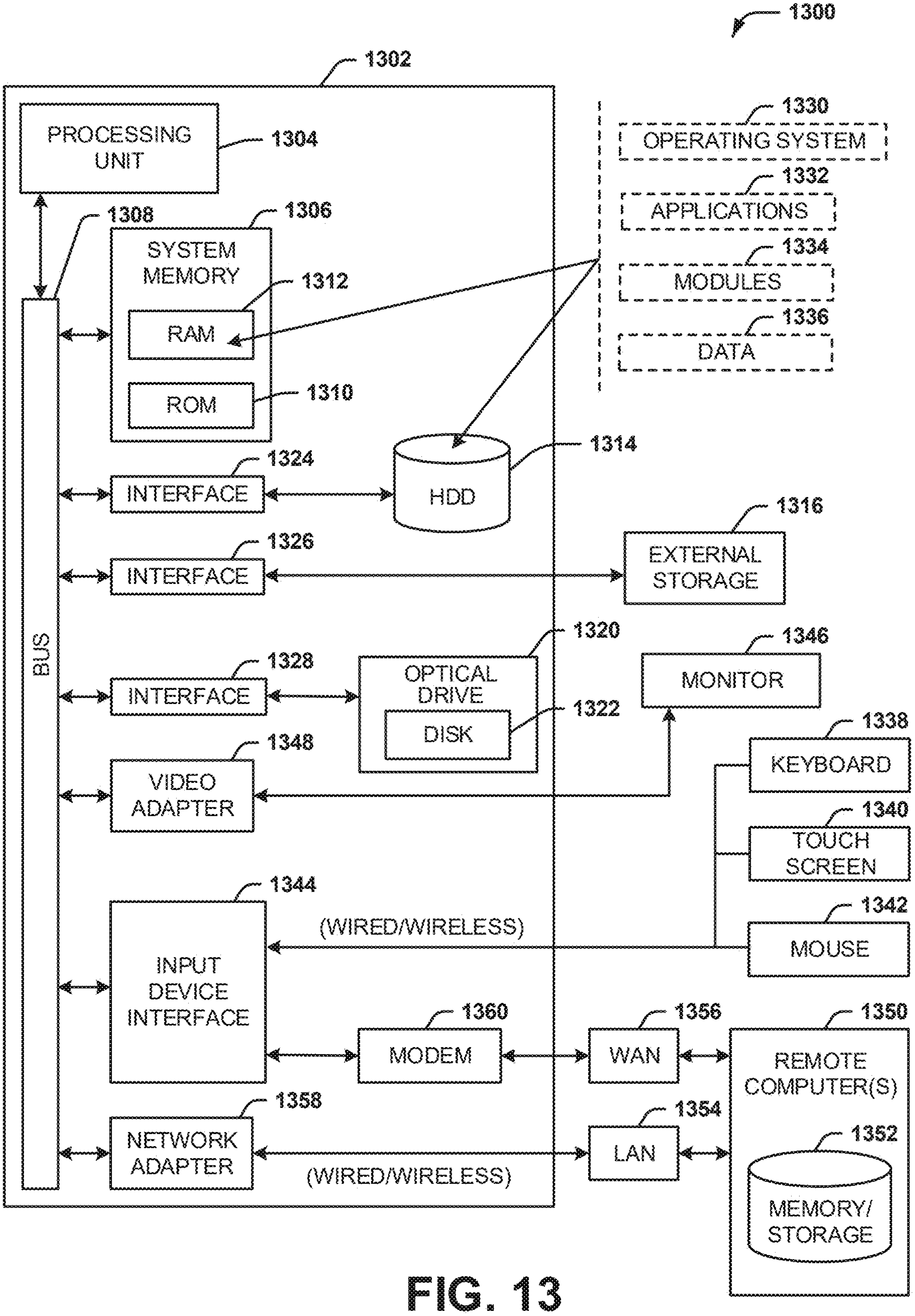
FIG. 13 is a diagram of an example computing environment in which various implementations described herein can function.

In order to provide additional context for various embodiments described herein, FIG. 13 and the following discussion are intended to provide a brief, general description of a suitable computing environment 1300 in which the various embodiments of the embodiment described herein can be implemented. While implementations have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and include any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference now to FIG. 13, an example general-purpose environment 1300 for implementing various embodiments described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), one or more external storage devices 1316 (e.g., a magnetic floppy disk drive (FDD), a memory stick or flash drive reader, a memory card reader, etc.) and an optical disk drive 1320 (e.g., which can read or write from a CD-ROM disc, a DVD, a BD, etc.). While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314. The HDD 1314, external storage device(s) 1316 and optical disk drive 1320 can be connected to the system bus 1308 by an HDD interface 1324, an external storage interface 1326 and an optical drive interface 1328, respectively. The interface 1324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are examples and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such a feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any embodiment or design described herein as "exemplary" and/or "demonstrative" is not necessarily to be construed as preferred or advantageous over other embodiments or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:

at least one processor; and at least one memory that stores executable instructions that, when executed by the at least one processor, facilitate performance of operations, the operations comprising:

rasterizing a depth map associated with a group of Gaussian primitives representative of a three-dimensional object, the rasterizing of the depth map comprising determining spatially varying depths within a Gaussian primitive of the group of Gaussian primitives;

rasterizing a surface normal map associated with the group of Gaussian primitives; and rendering, based on the depth map and the surface normal map associated with the group of Gaussian primitives, a three-dimensional reconstruction of the three-dimensional object.

2. The system of claim 1, wherein the determining of the spatially varying depths within the Gaussian primitive is based on intersection points between respective light rays and the Gaussian primitive.

3. The system of claim 2, wherein the rasterizing of the depth map comprises:

applying a local affine transformation to the Gaussian primitive from a Cartesian space to a non-Cartesian space; and determining the intersection points between the respective light rays and the Gaussian primitive in the non-Cartesian space.

4. The system of claim 3, wherein the intersection points form a plane in the non-Cartesian space, and wherein the rasterizing of the surface normal map comprises:

determining a normal direction of the plane in the non-Cartesian space; and reversing the local affine transformation, resulting in conversion of the normal direction of the plane in the non-Cartesian space to a surface normal direction of the Gaussian primitive in the Cartesian space.

5. The system of claim 3, wherein the respective light rays originate from a common origin point in the Cartesian space, and wherein the respective light rays are parallel and oriented in a constant direction in the non-Cartesian space.

6. The system of claim 2, wherein the intersection points comprise points along the respective light rays at which an intensity of the Gaussian primitive is maximized.

7. The system of claim 1, wherein the rasterizing of the depth map comprises:

projecting the Gaussian primitive onto an image plane, resulting in a two-dimensional Gaussian projection; and determining depths corresponding to respective pixels covered by the two-dimensional Gaussian projection in the image plane as a function of a depth of a center point of the Gaussian primitive and positions of the respective pixels on the image plane relative to the center point.

8. The system of claim 1, wherein the operations further comprise:

generating the three-dimensional reconstruction of the three-dimensional object based on an output of a machine learning model, wherein the machine learning model is trained using a loss function, the loss function being a function of a weighted sum of a depth distortion loss associated with the three-dimensional reconstruction and a normal consistency loss associated with the three-dimensional reconstruction.

9. The system of claim 1, wherein the rendering comprises displaying the three-dimensional reconstruction of the three-dimensional object in an augmented reality overlay.

10. A method, comprising:

rasterizing, by a system comprising at least one processor, a depth map associated with a group of Gaussian splats representative of a three-dimensional object, the rasterizing of the depth map comprising determining spatially varying depths within a Gaussian splat of the group of Gaussian splats;

rasterizing, by the system, a surface normal map associated with the group of Gaussian splats; and reconstructing, by the system, a three-dimensional model of the three-dimensional object based on the depth map and the surface normal map associated with the group of Gaussian splats.

11. The method of claim 10, wherein the determining of the spatially varying depths within the Gaussian splat is based on intersection points between respective light rays and the Gaussian splat, and wherein the rasterizing of the depth map comprises:

applying a local affine transformation to the Gaussian splat from a Cartesian space to a non-Cartesian space; and determining the intersection points between the respective light rays and the Gaussian splat in the non-Cartesian space.

12. The method of claim 11, wherein the intersection points form a plane in the non-Cartesian space, and wherein the rasterizing of the surface normal map comprises:

determining a normal direction of the plane in the non-Cartesian space; and reversing the local affine transformation, resulting in conversion of the normal direction of the plane in the non-Cartesian space to a surface normal direction of the Gaussian splat in the Cartesian space.

13. The method of claim 11, wherein the intersection points comprise points along the respective light rays at which a Gaussian function associated with the Gaussian splat is maximized.

14. The method of claim 11, wherein the respective light rays originate from a common origin point in the Cartesian space, and wherein the respective light rays are parallel and oriented in a constant direction in the non-Cartesian space.

15. The method of claim 10, wherein the rasterizing of the depth map comprises:

projecting the Gaussian splat onto an image plane, resulting in a two-dimensional Gaussian projection; and determining depths corresponding to respective pixels covered by the two-dimensional Gaussian projection in the image plane as a function of a depth of a center point of the Gaussian splat and positions of the respective pixels on the image plane relative to the center point.

16. A non-transitory machine-readable medium comprising computer executable instructions that, when executed by at least one processor, facilitate performance of operations, the operations comprising:

rasterizing a depth map associated with a group of Gaussian splats representative of a three-dimensional scene, the rasterizing of the depth map comprising determining spatially varying depths within a Gaussian splat of the group of Gaussian splats;

rasterizing a surface normal map associated with the group of Gaussian splats; and constructing a model of the three-dimensional scene based on the depth map and the surface normal map associated with the group of Gaussian splats.

17. The non-transitory machine-readable medium of claim 16, wherein the determining of the spatially varying depths within the Gaussian splat is based on intersection points between respective light rays and the Gaussian splat, and wherein the rasterizing of the depth map comprises:

applying a local affine transformation to the Gaussian splat from a first coordinate space to a second coordinate space; and determining the intersection points between the respective light rays and the Gaussian splat in the second coordinate space.

18. The non-transitory machine-readable medium of claim 17, wherein the intersection points form a plane in the second coordinate space, and wherein the rasterizing of the surface normal map comprises:

determining a normal direction of the plane in the second coordinate space; and reversing the local affine transformation, resulting in conversion of the normal direction of the plane in the second coordinate space to a surface normal direction of the Gaussian splat in the first coordinate space.

19. The non-transitory machine-readable medium of claim 16, wherein the rasterizing of the depth map comprises:

projecting the Gaussian splat onto an image plane, resulting in a projected Gaussian splat; and determining depths corresponding to respective pixels covered by the projected Gaussian splat in the image plane as a function of a depth of a center point of the Gaussian splat and positions of the respective pixels on the image plane relative to the center point.

20. The non-transitory machine-readable medium of claim 16, wherein the operations further comprise:

conveying the model of the three-dimensional scene to an obstacle detection system of an autonomous vehicle, resulting in the autonomous vehicle altering a navigation route associated with movement of the autonomous vehicle through an environment based on the model of the three-dimensional scene.

* * * * *